United States Patent
Karabinis

(10) Patent No.: US 8,199,837 B2
(45) Date of Patent: Jun. 12, 2012

(54) SYSTEMS/METHODS OF SEQUENTIAL MODULATION OF A SINGLE CARRIER FREQUENCY BY A PLURALITY OF ELEMENTS OF A WAVEFORM

(75) Inventor: Peter D. Karabinis, Reston, VA (US)

(73) Assignee: EICES Research, Inc., Cary, NC (US)

( * ) Notice: Subject to any disclaimer, the term of this patent is extended or adjusted under 35 U.S.C. 154(b) by 0 days.

(21) Appl. No.: 13/101,633

(22) Filed: May 5, 2011

(65) Prior Publication Data

US 2011/0206086 A1     Aug. 25, 2011

Related U.S. Application Data

(63) Continuation of application No. 11/720,115, filed as application No. PCT/US2006/020417 on May 25, 2006.

(60) Provisional application No. 60/692,932, filed on Jun. 22, 2005, provisional application No. 60/698,247, filed on Jul. 11, 2005.

(51) Int. Cl.
*H04K 1/10* (2006.01)
*H04L 27/28* (2006.01)

(52) U.S. Cl. .................. 375/260; 375/259

(58) Field of Classification Search ............ 375/260
See application file for complete search history.

(56) References Cited

U.S. PATENT DOCUMENTS

| | | | |
|---|---|---|---|
| 5,029,184 A | 7/1991 | Andren et al. | |
| 5,117,401 A * | 5/1992 | Feintuch | 367/135 |
| 5,394,433 A * | 2/1995 | Bantz et al. | 375/132 |
| 5,559,828 A | 9/1996 | Armstrong et al. | |
| 5,848,160 A | 12/1998 | Cai et al. | |
| 5,966,312 A | 10/1999 | Chen | |
| 6,433,720 B1 | 8/2002 | Libove et al. | |
| 6,661,847 B1 | 12/2003 | Davis et al. | |
| 6,799,141 B1 | 9/2004 | Stoustrup et al. | |
| 7,020,165 B2 | 3/2006 | Rakib et al. | |
| 7,218,693 B2 | 5/2007 | Troulis | |
| 7,292,627 B2 | 11/2007 | Tzannes | |
| 7,333,422 B2 | 2/2008 | Amer | |

(Continued)

FOREIGN PATENT DOCUMENTS

WO   WO 2005/036790 A1   4/2005

OTHER PUBLICATIONS

Carroll "Chaotic communications that are difficult to detect" *Physical Review E* 67(2):26207-1-26207-6 (Sep. 2003).

(Continued)

*Primary Examiner* — David C. Payne
*Assistant Examiner* — Erin File
(74) *Attorney, Agent, or Firm* — Myers Bigel Sibley & Sajovec, P.A.

(57) ABSTRACT

Systems and/or methods are disclosed for generating a waveform that comprises a plurality of elements by using a Fourier transform and/or an inverse Fourier transform. The waveform that comprises the plurality of elements may be transmitted by transmitting, sequentially in time, the plurality of elements. In some embodiments, the Fourier transform and/or inverse Fourier transform comprises a Fast Fourier Transform and/or Inverse Fast Fourier Transform and the waveform that comprises the plurality of elements may be transmitted by using, sequentially in time, the plurality of elements to modulate a single carrier frequency.

28 Claims, 9 Drawing Sheets

U.S. PATENT DOCUMENTS

| | | |
|---|---|---|
| 7,362,829 B2 | 4/2008 | Ojard |
| 7,505,522 B1 | 3/2009 | Larsson |
| 7,561,212 B2 | 7/2009 | Nakamura |
| 7,756,002 B2 | 7/2010 | Batra et al. |
| 7,830,995 B2 | 11/2010 | Ojard |
| 7,949,032 B1* | 5/2011 | Frost ............................. 375/140 |
| 7,970,345 B2* | 6/2011 | Cummiskey et al. ......... 455/12.1 |
| 2002/0150109 A1 | 10/2002 | Agee |
| 2002/0196765 A1 | 12/2002 | Tulino |
| 2003/0107513 A1 | 6/2003 | Abraham et al. |
| 2003/0228017 A1 | 12/2003 | Beadle et al. |
| 2004/0005013 A1* | 1/2004 | Nunally et al. ................ 375/295 |
| 2004/0039524 A1* | 2/2004 | Adachi .......................... 701/209 |
| 2004/0080315 A1 | 4/2004 | Beevor et al. |
| 2004/0086027 A1 | 5/2004 | Shattil |
| 2004/0095907 A1 | 5/2004 | Agee et al. |
| 2004/0132417 A1* | 7/2004 | Maeda et al. .................. 455/108 |
| 2004/0151109 A1 | 8/2004 | Batra et al. |
| 2004/0170430 A1 | 9/2004 | Gorokhov |
| 2004/0252853 A1 | 12/2004 | Blamey et al. |
| 2005/0128938 A1 | 6/2005 | Fang et al. |
| 2005/0243938 A1 | 11/2005 | Armstrong et al. |
| 2005/0255878 A1* | 11/2005 | Leinonen et al. ........... 455/552.1 |
| 2005/0281321 A1 | 12/2005 | Bergstrom et al. |
| 2006/0088187 A1 | 4/2006 | Clarkson et al. |
| 2006/0171445 A1* | 8/2006 | Batra et al. ..................... 375/130 |
| 2006/0227889 A1 | 10/2006 | Uchida et al. |
| 2007/0015460 A1* | 1/2007 | Karabinis et al. ............. 455/12.1 |
| 2007/0032890 A1 | 2/2007 | Zhou et al. |
| 2007/0177680 A1 | 8/2007 | Green et al. |
| 2007/0211786 A1* | 9/2007 | Shattil ........................... 375/141 |
| 2008/0019341 A1 | 1/2008 | Perlman |
| 2009/0110033 A1 | 4/2009 | Shattil |
| 2009/0168844 A1 | 7/2009 | Larsson |
| 2009/0279422 A1* | 11/2009 | Fonseka et al. ............... 370/215 |

OTHER PUBLICATIONS

Gardner "Signal Interception: A Unifying Theoretical Framework for Feature Detection" *IEEE Transactions on Communications* 36(8):897-906 (Aug. 1988).

International Preliminary Report on Patentability, PCT International Application No. PCT/US09/01152, Nov. 8, 2010.

Karabinis, *Wireless Communications Systems and/or Methods Providing Low Interference, High Privacy and/or Cognitive Flexibility* U.S. Appl. No. 12/372,354, filed Feb. 17, 2009.

Notification of Transmittal of the International Search Report and the Written Opinion of the International Searching Authority, or the Declaration, International Search Report, Written Opinion of the International Searching Authority, PCT Application No. PCT/US2009/001152, May 7, 2009.

Dinis et al., "A Multiple Access Scheme for the Uplink of Broadband Wireless Systems", *IEEE Global Telecommunications Conference*, vol. 6, Nov. 29-Dec. 3, 2004, pp. 3808-3812.

Ekström et al., "Technical Solutions for the 3G Long-Term Evolution", *IEEE Communications Magazine*, vol. 44, No. 3, Mar. 2006, pp. 38-45.

Falconer et al., "Frequency Domain Equalization for Single-Carrier Broadband Wireless Systems", *IEEE Communications Magazine*, vol. 40, No. 4, Apr. 2002, pp. 58-66.

Myung et al. "Single Carrier FDMA for Uplink Wireless Transmission", *IEEE Vehicular Technology Magazine*, vol. 1, No. 3, Sep. 2006, pp. 30-38.

Sari et al., "Transmission Techniques for Digital Terrestrial TV Broadcasting", *IEEE Communications Magazine*, vol. 33, No. 2, Feb. 1995, pp. 100-109.

Song et al. "Cross-Layer Optimization for OFDM Wireless Networks—Part II: Algorithm Development", *IEEE Transactions on Wireless Communications*, vol. 4, No. 2, Mar. 2005, pp. 625-634.

Sorger et al., "Interleaved FDMA—A New Spread-Spectrum Multiple-Access Scheme", *IEEE International Conference on Communications*, vol. 2, Jun. 7-11, 1998, pp. 1013-1017.

3GPP/LTE Advanced, "3$^{rd}$ Generation Partnership Project: Technical Specification Group Radio Access Network; Evolved Universal Terrestrial Radio Access (E-UTRA); Physical channels and modulation (Release 10)", 3GPP TS 36.211, V10.0.0, Dec. 2010, 103 pp.

Galda et al., "A Low Complexity Transmitter Structure for OFDM-FDMA Uplink Systems" *IEEE 55$^{th}$ Vehicular Technology Conference*, 2002, vol. 4, May 2002, pp. 1737-1741.

3G Americas, "UMTS Evolution from 3GPP Release 7 to Release 8 HSPA and SAE/LTE", Jul. 2007, 89 pp.

Benvenuto et al., "On the Comparison Between OFDM and Single Carrier Modulation With a DFE Using a Frequency-Domain Feedforward Filter", *IEEE Transactions on Communications*, vol. 50, No. 6, Jun. 2002, pp. 947-955.

Dahlman, "3G long-term evolution", Telefon AB LM Ericsson, 2005, 36 pp.

Dinis et al., "A Multiple Access Scheme for the Uplink of Broadband Wireless Systems", *IEEE Global Telecommunications Conference*, Nov. 29-Dec. 3, 2004, vol. 6, pp. 3808-3812.

Gessner et al., "LTD technology and LTE test; a deskside chat", Rohde & Schwarz, Apr. 2009, 93 pp.

Ishii, "Draft2 Report of 3GPP TSG RAN WG1 #40bis in Beijing (Beijing, China, Apr. 4-8, 2005)", R1-050376, Agenda Item 3, 3GPP TSG RAN WG1 Meeting #41, Athens, Greece, May 9-13, 2005, 65 pp.

Ixia "SC-FDMA Single Carrier FDMA in LTE" White Paper, Rev. A, Nov. 2009, 16 pp.

Lim et al., "Channel-Dependent Scheduling of Uplink Single Carrier FDMA Systems" *IEEE 64$^{th}$ Vehicular Technology Conference*, Montreal, Quebec, Sep. 25-28, 2006, pp. 1-5.

Motorola, "R1-050971 Single Carrier Uplink Options for E-UTRA: IFDMA/DFT-SOFDM Discussion and Initial Performance Results", 3GPP TSG RAN WG1 #42, London, United Kingdom, Agenda Item: 10.3, Aug. 29-Sep. 2, 2005, 30 pp.

Motorola, "Uplink Numerology and Frame Structure", 3GPP TSG RAN1#41 Meeting, Athens, Greece, Agenda Item 13.2, May 9-13, 2005, 10 pp.

Myung et al., "Single Carrier FDMA for Uplink Wireless Transmission", *IEEE Vehicular Technology Magazine*, Sep. 2006, pp. 30-38.

Nokia, "Uplink Considerations for UTRAN LTE", 3GPP TSG RAN WG1 #40bis, Beijing, China, R1-050251, Agenda Item 12.2.1, Apr. 4-8, 2005, 8 pp.

Rumney, "3GPP LTE: Introducing Single-Carrier FDMA", *Agilent Measurement Journal*, Jan. 1, 2008, 10 pp.

* cited by examiner $I_k \in \{I_1, I_2, \ldots I_M\}$ for $\forall k$ $\{I_k\} = \sum_k I_k \, \delta(t - k\tau)$ $U_k \in \{U_1, U_2, \ldots, U_M\}$ or $\{I_k\} = \sum I_k \, \delta(t - \tau_k)$ ↑
Random variable $$f_{CLK} = 1/(\alpha\tau); \quad \alpha < 1; \quad \alpha\tau \leq T$$

SYSTEMS/METHODS OF SEQUENTIAL MODULATION OF A SINGLE CARRIER FREQUENCY BY A PLURALITY OF ELEMENTS OF A WAVEFORM

CLAIM FOR PRIORITY

This application is continuation of U.S. patent application Ser. No. 11/720,115, filed May 24, 2007, entitled Systems, Methods, Devices and/or Computer Program Products For Providing Communications Devoid of Cyclostationary Features, which itself is a 35 U.S.C. §371 national stage application of PCT Application No. PCT/US2006/020417, filed on May 25, 2006, which itself claims priority to U.S. Provisional Patent Application No. 60/692,932, filed Jun. 22, 2005, entitled Communications Systems, Methods, Devices and Computer Program Products for Low Probability of Intercept (LPI), Low Probability of Detection (LPD) and/or Low Probability of Exploitation (LPE) of Communications Information, and also claims priority to U.S. Provisional Patent Application No. 60/698,247, filed Jul. 11, 2005, entitled Additional Communications Systems, Methods, Devices and Computer Program Products for Low Probability of Intercept (LPI), Low Probability of Detection (LPD) and/or Low Probability of Exploitation (LPE) of Communications Information and/or Minimum Interference Communications, the entirety of all of which are incorporated herein by reference. The above-referenced PCT International Application was published in the English language as International Publication No. WO 2007/001707.

FIELD OF THE INVENTION

This invention relates to Low Probability of Intercept (LPI), Low Probability of Detection (LPD) and/or Low Probability of Exploitation (LPE) communications and/or Minimum Interference Communications (MIC) systems, methods, devices and/or computer program products.

BACKGROUND

Known systems and/or methods of LPI/LPD/LPE and/or Jam Resistant (JR) communications and/or Burst Communications (BURSTCOMM) may combine, in general, hybrid spread-spectrum waveforms comprising Frequency-Hopping (FH), Direct Sequence Pseudo-Noise (DSPN) spreading and/or Time-Hopping (TH) to increase covertness and/or resistance to jamming. Transmitting a FH/DSPN spread-spectrum waveform in pseudo-random short bursts using, for example, a TH technique, may, for example, reduce an interceptor's ability to integrate sufficient energy to trigger a detectability threshold associated with a radiometer that the interceptor may be using as a means of signal detection/identification. It is known that a radiometric approach to signal detection/identification may yield a suboptimum and/or unsatisfactory performance measure when attempting to detect/identify/exploit a FH/DSPN/TH spread-spectrum communications signal in a changing noise and/or interference environment. This may be due to a background noise/interference level and/or a signal energy reaching the interceptor's receiver being insufficient over the interceptor's radiometric integration time.

SUMMARY

A wireless communications system configured for Low Probability of Intercept (LPI), Low Probability of Detection (LPD) and/or Low Probability of Exploitation (LPE) communications may use waveforms substantially devoid of a cyclostationary signature to improve a LPI/LPD/LPE property. A set of M independent "seed" waveforms that satisfy a time-bandwidth constraint may be used via a Gram-Schmidt Orthogonalization (GSO) procedure to generate M orthonormal functions. In accordance with exemplary embodiments of the present invention, the M seed waveforms may, for example, be chosen from a band-limited Gaussian-distributed process (such as, for example, Gaussian-distributed pseudo-random noise) and may be used to generate, via an orthogonalization operation, such as, for example, a GSO, a corresponding set of M Gaussian-distributed orthonormal functions substantially devoid of a cyclostationary property.

The set of M Gaussian-distributed orthonormal functions may be used in a communications system to define a signaling alphabet of a transmitter of the communications system (and a corresponding matched filter bank of a receiver of the communications system) to thereby reduce or eliminate a cyclostationary signature of a transmitted communications waveform and thus increase a covertness measure of the communications system.

The set of M Gaussian-distributed orthonormal functions may be updated, modified and/or changed as often as necessary to further increase and/or maximize a covertness measure of the communications system.

A receiver of the communications system may be equipped with substantially the same algorithm(s) that are used by the transmitter of the communications system and the receiver may be substantially synchronized with the transmitter to thereby re-create and use at the receiver the M Gaussian-distributed orthonormal functions for detection of communications information.

The set of M orthonormal functions may, in some embodiments, be a set of orthogonal but not necessarily orthonormal functions. In further embodiments, the set of M orthonormal functions may be non-Gaussian distributed and may be, for example, uniformly distributed, Rayleigh distributed and/or distributed in accordance with any other known (continuous and/or discrete) and/or arbitrary distribution. In still further embodiments of the invention, different functions/elements of an M-ary orthonormal and/or orthogonal signaling alphabet may be differently distributed.

Embodiments of the invention provide a transmitter comprising a system for communicating information based upon a waveform that is substantially devoid of a cyclostationary property. The transmitter may comprise at least one waveform alphabet including a plurality of elements, wherein the waveform that is substantially devoid of a cyclostationary property may include at least one element of the plurality of elements of the at least one waveform alphabet. The at least one waveform alphabet may be generated based upon at least one statistical distribution responsive to a key and/or Time-of-Day (TOD) value.

In some embodiments, communicating information comprises associating a measure of information with at least one element of the at least one waveform alphabet wherein the measure of information may be a message and/or symbol comprising at least one bit.

In some embodiments, at least first and second elements of the plurality of elements are substantially orthogonal therebetween and/or substantially orthonormal. The at least one statistical distribution may comprise a Normal/Gaussian, Bernoulli, Geometric, Pascal/Negative Binomial, Exponential, Erlang, Weibull, Chi-Squared, F, Student's t, Rise, Pareto, Poisson, Binomial, Uniform, Gamma, Beta, Laplace, Cauchy, Rayleigh, Maxwell and/or any other distribution. According to some embodiments, the at least one statistical distribution is truncated.

In further embodiments, the key comprises a bit sequence and in some embodiments, the bit sequence comprises a TRANsmissions SECurity (TRANSEC) and/or a COMMunications SECurity (COMMSEC) bit sequence. The Time-of-Day (TOD) value may be based upon GPS. Generating the at least one waveform alphabet may comprise using a predetermined algorithm and/or look-up table.

In some embodiments, an element of the plurality of elements is based upon a plurality of time-domain and/or frequency-domain values, wherein a time-domain and/or frequency-domain value of the plurality of time-domain and/or frequency-domain values may be real, imaginary and/or complex.

The transmitter may further comprise a direct waveform synthesis devoid of a frequency translation, wherein the direct waveform synthesis is used to generate the at least one waveform alphabet. In some embodiments, the direct waveform synthesis comprises at least one pseudo-random generator, filter, Analog-to-Digital (A/D) converter, Digital-to-Analog (D/A) converter, Fourier transform, inverse Fourier transform and/or orthogonalizer, wherein the Fourier transform may be a Discrete Fourier Transform (DFT) and/or a Fast Fourier Transform (FFT) and the inverse Fourier transform may be an Inverse Discrete Fourier Transform (IDFT) and/or an Inverse Fast Fourier Transform (IFFT).

In further embodiments, the orthogonalizer may be a Gram-Schmidt orthogonalizer. In still further embodiments, the at least one waveform alphabet may comprise at least two waveform alphabets. The at least one waveform alphabet may be used over a first time interval and not used over a second time interval, wherein the first time interval may be associated with a Time-of-Day (TOD) value, message, symbol and/or bit. The at least one second waveform alphabet may be used over the second time interval and the at least one waveform alphabet and the at least one second waveform alphabet may be different therebetween, wherein different comprises a difference in a time-domain and/or frequency-domain characteristic.

In some embodiments, the transmitter may further be configured to transmit at least one second waveform during a time interval that is not associated with communicating information, wherein the at least one second waveform may be devoid of a cyclostationary property and may comprise a frequency content that is substantially the same as a frequency content of the waveform. The frequency content may be a power spectral density.

In some embodiments, the transmitter is fixed, mobile, portable, transportable, installed in a vehicle and/or installed in a space-based component such as a satellite. The vehicle may be a land-mobile vehicle, a maritime vehicle, an aeronautical vehicle and/or an unmanned vehicle.

In further embodiments, the transmitter being devoid of a cyclostationary property comprises being devoid of a chipping rate. The transmitter may further include Forward Error Correction (FEC) encoding, bit repetition, bit interleaving, bit-to-symbol conversion, symbol repetition, symbol interleaving, symbol-to-waveform mapping, waveform repetition and/or waveform interleaving and, according to some embodiments, the transmitter may include communicating information wirelessly and/or communicating spread-spectrum information.

In some embodiments, the waveform comprises a first plurality of frequencies over a first time interval and a second plurality of frequencies over a second time interval, wherein the first plurality of frequencies differ from the second plurality of frequencies in at least one frequency. In further embodiments, at least some frequencies of the first and/or second plurality of frequencies are also used by a second transmitter, wherein the second transmitter may be a transmitter associated with a commercial communications system.

The at least one waveform alphabet may be used deterministically and/or pseudo-randomly, wherein used deterministically and/or pseudo-randomly may comprise usage of the at least one waveform alphabet responsive to a Time-of-Day (TOD) value, a pseudo-random selection and/or a usage of one or more waveform alphabets other than the at least one waveform alphabet. In some embodiments, usage comprises usage of at least one element of the plurality of elements of the at least one waveform alphabet.

In some embodiments, the transmitter comprises a synthesis associated with the waveform that is substantially devoid of a frequency translation. The synthesis may include a plurality of operations that are used to form the waveform, the plurality of operations not including a frequency translation and the transmitter communicating information based upon the waveform without subjecting the waveform to a frequency translation.

According to some embodiments of the invention, the plurality of operations include generating values pseudo-randomly, a Fourier transform, a Discrete Fourier Transform (DFT), a Fast Fourier Transform (FFT), an inverse Fourier transform, an Inverse Discrete Fourier Transform (IDFT), an Inverse Fast Fourier Transform (IFFT), Forward Error Correction (FEC) encoding, bit interleaving, bit-to-symbol conversion, symbol interleaving, symbol-to-waveform mapping, waveform repetition, filtering, amplification and/or waveform interleaving. In some embodiments, generating values pseudo-randomly comprises generating at least one value responsive to a Time-of-Day (TOD) value and/or a key input.

In further embodiments, generating at least one value pseudo-randomly comprises generating at least one value based upon at least one statistical distribution, wherein the at least one statistical distribution may comprise a Normal/Gaussian, Bernoulli, Geometric, Pascal/Negative Binomial, Exponential, Erlang, Weibull, Chi-Squared, F, Student's t, Rise, Pareto, Poisson, Binomial, Uniform, Gamma, Beta, Laplace, Cauchy, Rayleigh, Maxwell and/or any other distribution and the at least one statistical distribution may be truncated. The at least one value may be a time-domain and/or frequency-domain value and the at least one value may be real, imaginary and/or complex. The at least one value may be based upon at least one statistical distribution.

Embodiments of the invention provide a transmitter comprising a synthesis block and a transmission block, wherein the synthesis block is configured to synthesize at least one alphabet based upon at least one statistical distribution and the transmission block is configured to transmit a waveform based upon the at least one alphabet. In some embodiments the waveform may be devoid of a cyclostationary property and the at least one alphabet may comprise a plurality of elements and each element of the plurality of elements may be devoid of a cyclostationary property. The synthesis block may be a direct synthesis block that does not include a frequency translation function and the transmission block may not include a frequency translation function.

In some embodiments, the at least one statistical distribution comprises a Normal/Gaussian, Bernoulli, Geometric, Pascal/Negative Binomial, Exponential, Erlang, Weibull, Chi-Squared, F, Student's t, Rise, Pareto, Poisson, Binomial, Uniform, Gamma, Beta, Laplace, Cauchy, Rayleigh, Maxwell and/or any other distribution and the at least one statistical distribution may be truncated.

In further embodiments, the at least one alphabet comprises a plurality of elements and at least a first and second element of the plurality of elements are substantially orthogonal therebetween. In still further embodiments, substantially orthogonal comprises substantially orthonormal. The at least one alphabet may be generated based upon the at least one statistical distribution responsive to a key and/or Time-of-Day (TOD) value and may be used by the transmitter for communicating information. In some embodiments, communicating information comprises associating a measure of information with at least one element of the at least one alphabet, wherein the measure of information may be a message and/or symbol comprising at least one bit. The key may comprise a bit sequence and the bit sequence may comprise a TRANsmissions SECurity (TRANSEC) and/or a COMMunications SECurity (COMMSEC) bit sequence. The Time-of-Day (TOD) value may be based upon GPS.

In some embodiments, generating the at least one alphabet comprises using a predetermined algorithm and/or look-up table. In further embodiments, an element of the plurality of elements is based upon a plurality of time-domain and/or frequency-domain values, wherein a time-domain and/or frequency-domain value of the plurality of time-domain and/or frequency-domain values may be real, imaginary and/or complex.

In still other embodiments, the synthesis block comprises a direct waveform synthesis devoid of a frequency translation, wherein the direct waveform synthesis is used to generate the at least one alphabet. The direct waveform synthesis may comprise at least one pseudo-random generator, filter, Analog-to-Digital (A/D) converter, Digital-to-Analog (D/A) converter, Fourier transform, inverse Fourier transform and/or orthogonalizer. The Fourier transform may be a Discrete Fourier Transform (DFT) and/or a Fast Fourier Transform (FFT) and the inverse Fourier transform may be an Inverse Discrete Fourier Transform (IDFT) and/or an Inverse Fast Fourier Transform (IFFT). The orthogonalizer may be a Gram-Schmidt orthogonalizer.

In further embodiments, the at least one alphabet comprises at least two alphabets. The at least one alphabet may be used over a first time interval and not used over a second time interval, wherein the first time interval may be associated with a Time-of-Day (TOD) value, message, symbol and/or bit. At least one second alphabet may be used over the second time interval. The at least one alphabet and the at least one second alphabet may be different therebetween, wherein different may comprise a difference in a time-domain and/or frequency-domain characteristic.

In still further embodiments, at least one second waveform is transmitted during a time interval that is not associated with communicating information, wherein the at least one second waveform may be devoid of a cyclostationary property and may comprise a frequency content that is substantially the same as a frequency content of the waveform. The frequency content may be a power spectral density.

According to some embodiments, the transmitter is fixed, mobile, portable, transportable, installed in a vehicle and/or installed in a satellite. The vehicle may be a land-mobile vehicle, a maritime vehicle, an aeronautical vehicle and/or an unmanned vehicle. In further embodiments, devoid of a cyclostationary property comprises devoid of a chipping rate.

In accordance with some embodiments, the transmitter further comprises Forward Error Correction (FEC) encoding, bit repetition, bit interleaving, bit-to-symbol conversion, symbol repetition, symbol interleaving, symbol-to-waveform mapping, waveform repetition and/or waveform interleaving. In accordance with other embodiments, communicating information comprises communicating information wirelessly. In further embodiments, communicating information comprises communicating spread-spectrum information. According to further embodiments, the waveform comprises a first plurality of frequencies over a first time interval and a second plurality of frequencies over a second time interval, wherein the first plurality of frequencies differ from the second plurality of frequencies in at least one frequency.

In some embodiments, at least some frequencies of the first and/or second plurality of frequencies are also used by a second transmitter. The second transmitter may be a transmitter of a commercial communications system. In other embodiments, the at least one alphabet is used deterministically and/or pseudo-randomly, wherein used deterministically and/or pseudo-randomly may comprise usage of the at least one alphabet responsive to a Time-of-Day (TOD) value, a pseudo-random selection and/or a usage of one or more alphabets other than the at least one alphabet. In further embodiments, usage comprises usage of at least one element of the plurality of elements of the at least one alphabet.

In still further embodiments of the invention, a synthesis associated with the waveform is substantially devoid of a frequency translation. The synthesis may include a plurality of operations that may be used to form the waveform, the plurality of operations may not include a frequency translation and the transmitter may transmit the waveform without subjecting the waveform to a frequency translation. The plurality of operations may include generating values pseudo-randomly, a Fourier transform, a Discrete Fourier Transform (DFT), a Fast Fourier Transform (FFT), an inverse Fourier transform, an Inverse Discrete Fourier Transform (IDFT), an Inverse Fast Fourier Transform (IFFT), Forward Error Correction (FEC) encoding, bit interleaving, bit-to-symbol conversion, symbol interleaving, symbol-to-waveform mapping, waveform repetition, filtering, amplification and/or waveform interleaving.

In accordance with some embodiments, generating values pseudo-randomly comprises generating at least one value responsive to a Time-of-Day (TOD) value and/or a key input. In further embodiments, generating at least one value pseudo-randomly comprises generating at least one value based upon at least one statistical distribution, the at least one statistical distribution comprising a Normal/Gaussian, Bernoulli, Geometric, Pascal/Negative Binomial, Exponential, Erlang, Weibull, Chi-Squared, F, Student's t, Rise, Pareto, Poisson, Binomial, Uniform, Gamma, Beta, Laplace, Cauchy, Rayleigh, Maxwell and/or any other distribution. In some embodiments, the at least one statistical distribution may be truncated. In further embodiments, the at least one value is a time-domain and/or frequency-domain value.

In still further embodiments of the invention, the at least one value is real, imaginary and/or complex. The at least one value may be based upon at least one statistical distribution, wherein the at least one statistical distribution comprises a Normal/Gaussian, Bernoulli, Geometric, Pascal/Negative Binomial, Exponential, Erlang, Weibull, Chi-Squared, F, Student's t, Rise, Pareto, Poisson, Binomial, Uniform, Gamma, Beta, Laplace, Cauchy, Rayleigh, Maxwell and/or any other distribution. The at least one statistical distribution may be a truncated distribution.

Embodiments of the invention provide a transmitter comprising a system for communicating information based upon a spread-spectrum waveform that is substantially devoid of a chipping rate.

Other embodiments of the invention provide a receiver comprising a system for receiving information from a transmitter, wherein the information is based upon a spread-spectrum waveform that is substantially devoid of a chipping rate.

Further embodiments of the invention provide a transmitter comprising a system for communicating information based upon a waveform that is substantially Gaussian distributed.

Still further embodiments of the invention provide a receiver comprising a system for receiving information from a transmitter, wherein the information is based upon a waveform that is substantially Gaussian distributed. Additional embodiments provide a transmitter comprising a system for communicating information based upon a waveform that does not include a cyclostationary signature.

Some embodiments provide a receiver comprising a system for receiving information from a transmitter, wherein the information is based upon a waveform that does not include a cyclostationary signature.

Other embodiments provide a transmitter comprising a system for mapping an information sequence onto a waveform sequence that is substantially devoid of a cyclostationary signature.

Further embodiments provide a receiver comprising a system for mapping a waveform sequence that is substantially devoid of a cyclostationary signature onto an information sequence.

Still further embodiments provide a receiver comprising a system for providing information based upon processing a waveform that is substantially devoid of a cyclostationary property.

Additional embodiments provide a receiver comprising a system for receiving information comprising at least one alphabet based upon at least one statistical distribution.

Embodiments of the invention further provide a transmitter comprising a system for transmitting a waveform, wherein the waveform is based upon at least one alphabet that is based upon at least one statistical distribution. The at least one statistical distribution comprises a Normal/Gaussian, Bernoulli, Geometric, Pascal/Negative Binomial, Exponential, Erlang, Weibull, Chi-Squared, F, Student's t, Rise, Pareto, Poisson, Binomial, Uniform, Gamma, Beta, Laplace, Cauchy, Rayleigh, Maxwell and/or any other distribution, wherein the at least one statistical distribution may be truncated.

In some embodiments, the at least one alphabet comprises a plurality of elements and at least a first and second element of the plurality of elements are substantially orthogonal therebetween. In some embodiments, substantially orthogonal comprises substantially orthonormal.

Embodiments of the invention provide a receiver comprising a system for receiving a waveform, wherein the waveform is based upon at least one alphabet that is based upon at least one statistical distribution. The at least one statistical distribution comprises a Normal/Gaussian, Bernoulli, Geometric, Pascal/Negative Binomial, Exponential, Erlang, Weibull, Chi-Squared, F, Student's t, Rise, Pareto, Poisson, Binomial, Uniform, Gamma, Beta, Laplace, Cauchy, Rayleigh, Maxwell and/or any other distribution, wherein the at least one statistical distribution may be truncated. The at least one alphabet may comprise a plurality of elements and at least a first and second element of the plurality of elements may be substantially orthogonal therebetween. In some embodiments, substantially orthogonal comprises substantially orthonormal.

In accordance with some embodiments of the present invention, a method of communicating information is provided, the method comprising transmitting and/or receiving a waveform that is substantially devoid of a cyclostationary property. The method optionally further comprises using at least one waveform alphabet including a plurality of elements, wherein the waveform that is substantially devoid of a cyclostationary property includes at least one element of the plurality of elements of the at least one waveform alphabet. In accordance with the method, the at least one waveform alphabet is optionally generated based upon at least one statistical distribution responsive to a key and/or Time-of-Day (TOD) value. Further in accordance with the method, communicating information optionally comprises associating a measure of information with at least one element of the at least one waveform alphabet. The measure of information may be a message and/or symbol comprising at least one bit.

In accordance with the method, at least first and second elements of the plurality of elements may be substantially orthogonal therebetween, wherein substantially orthogonal may comprise substantially orthonormal.

Further in accordance with the method, the at least one statistical distribution optionally comprises a Normal/Gaussian, Bernoulli, Geometric, Pascal/Negative Binomial, Exponential, Erlang, Weibull, Chi-Squared, F, Student's t, Rise, Pareto, Poisson, Binomial, Uniform, Gamma, Beta, Laplace, Cauchy, Rayleigh, Maxwell and/or any other distribution, wherein the at least one statistical distribution may be truncated.

In some embodiments according to the method, the key comprises a bit sequence, wherein the bit sequence may comprise a TRANsmissions SECurity (TRANSEC) and/or a COMMunications SECurity (COMMSEC) bit sequence.

In further embodiments, the Time-of-Day (TOD) value is based upon GPS. In still further embodiments, generating the at least one waveform alphabet comprises using a predetermined algorithm and/or look-up table. In some embodiments, an element of the plurality of elements is based upon a plurality of time-domain and/or frequency-domain values, wherein a time-domain and/or frequency-domain value of the plurality of time-domain and/or frequency-domain values may be real, imaginary and/or complex.

According to some embodiments according to the method, the method further comprises a direct waveform synthesis devoid of a frequency translation, wherein the direct waveform synthesis is used to generate the at least one waveform alphabet, wherein the direct waveform synthesis may comprise at least one pseudo-random generator, filter, Analog-to-Digital (A/D) converter, Digital-to-Analog (D/A) converter, Fourier transform, inverse Fourier transform and/or orthogonalizer. In some embodiments, the Fourier transform is a Discrete Fourier Transform (DFT) and/or a Fast Fourier Transform (FFT) and the inverse Fourier transform is an Inverse Discrete Fourier Transform (IDFT) and/or an Inverse Fast Fourier Transform (IFFT). In further embodiments, the orthogonalizer is a Gram-Schmidt orthogonalizer.

In accordance with other embodiments of the invention, the at least one waveform alphabet comprises at least two waveform alphabets. In accordance with some embodiments, the at least one waveform alphabet is used over a first time interval and not used over a second time interval, wherein the first time interval may be associated with a Time-of-Day (TOD) value, message, symbol and/or bit.

In accordance with further embodiments of the invention, at least one second waveform alphabet is used over the second time interval, wherein the at least one waveform alphabet and the at least one second waveform alphabet may be different therebetween. In some embodiments, different comprises a difference in a time-domain and/or frequency-domain characteristic.

In still other embodiments of the invention, the method comprises transmitting at least one second waveform during a time interval that is not associated with communicating information, wherein the at least one second waveform may be devoid of a cyclostationary property and may comprise a frequency content that is substantially the same as a frequency content of the waveform. The frequency content may be a power spectral density. In further embodiments of the invention, the method comprises using a transmitter that is fixed, mobile, portable, transportable, installed in a vehicle and/or installed in a satellite. The vehicle may be a land-mobile vehicle, a maritime vehicle, an aeronautical vehicle and/or an unmanned vehicle.

In some embodiments in accordance with the method, devoid of a cyclostationary property comprises devoid of a chipping rate. The method optionally further comprises using Forward Error Correction (FEC) encoding, bit repetition, bit interleaving, bit-to-symbol conversion, symbol repetition, symbol interleaving, symbol-to-waveform mapping, waveform repetition and/or waveform interleaving. In some embodiments according to the method, communicating information comprises communicating information wirelessly. In other embodiments according to the method, communicating information comprises communicating spread-spectrum information.

In further embodiments in accordance with the method, the waveform comprises a first plurality of frequencies over a first time interval and a second plurality of frequencies over a second time interval, wherein the first plurality of frequencies differ from the second plurality of frequencies in at least one frequency. In some embodiments in accordance with the method, at least some frequencies of the first and/or second plurality of frequencies are also used by a second transmitter, wherein the second transmitter may be a transmitter of a commercial communications system.

In accordance with the method, the at least one waveform alphabet is optionally used deterministically and/or pseudo-randomly, wherein used deterministically and/or pseudo-randomly optionally comprises usage of the at least one waveform alphabet responsive to a Time-of-Day (TOD) value, a pseudo-random selection and/or a usage of one or more waveform alphabets other than the at least one waveform alphabet. In accordance with the method, usage optionally comprises usage of at least one element of the plurality of elements of the at least one waveform alphabet.

The method optionally further comprises a synthesis associated with the waveform that may be substantially devoid of a frequency translation. In accordance with the method, the synthesis optionally includes a plurality of operations that are used to form the waveform, the plurality of operations not including a frequency translation and wherein the transmitter communicates information based upon the waveform without subjecting the waveform to a frequency translation. The plurality of operations may include generating values pseudo-randomly, a Fourier transform, a Discrete Fourier Transform (DFT), a Fast Fourier Transform (FFT), an inverse Fourier transform, an Inverse Discrete Fourier Transform (IDFT), an Inverse Fast Fourier Transform (IFFT), Forward Error Correction (FEC) encoding, bit interleaving, bit-to-symbol conversion, symbol interleaving, symbol-to-waveform mapping, waveform repetition, filtering, amplification and/or waveform interleaving.

Generating values pseudo-randomly may comprise generating at least one value responsive to a Time-of-Day (TOD) value and/or a key input. Generating at least one value may comprise generating at least one value based upon at least one statistical distribution. The at least one statistical distribution may comprise a Normal/Gaussian, Bernoulli, Geometric, Pascal/Negative Binomial, Exponential, Erlang, Weibull, Chi-Squared, F, Student's t, Rise, Pareto, Poisson, Binomial, Uniform, Gamma, Beta, Laplace, Cauchy, Rayleigh, Maxwell and/or any other distribution. In accordance with the method, the at least one statistical distribution may be truncated.

Further in accordance with the method, the at least one value may be a time-domain and/or frequency-domain value. The at least one value may be real, imaginary and/or complex and the at least one value may be based upon at least one statistical distribution.

According to embodiments of the present invention, a method of transmitting a signal is provided, the method comprising synthesizing at least one alphabet based upon at least one statistical distribution and transmitting a waveform based upon the at least one alphabet, wherein the waveform may be devoid of a cyclostationary property and the at least one alphabet may comprise a plurality of elements, each element of the plurality of elements may be devoid of a cyclostationary property. The synthesizing may be a direct synthesis that does not include a frequency translation function. Further according to the method, the transmitting may not include a frequency translation function.

The at least one statistical distribution may comprise a Normal/Gaussian, Bernoulli, Geometric, Pascal/Negative Binomial, Exponential, Erlang, Weibull, Chi-Squared, F, Student's t, Rise, Pareto, Poisson, Binomial, Uniform, Gamma, Beta, Laplace, Cauchy, Rayleigh, Maxwell and/or any other distribution, wherein the at least one statistical distribution may be truncated.

In accordance with the method, the at least one alphabet may comprise a plurality of elements and at least a first and second element of the plurality of elements may be substantially orthogonal therebetween. Substantially orthogonal may comprise substantially orthonormal. According to further embodiments of the present invention, the at least one alphabet may be generated based upon the at least one statistical distribution responsive to a key and/or Time-of-Day (TOD) value and may be used by a transmitter for communicating information. Communicating information may comprise associating a measure of information with at least one element of the at least one alphabet. The measure of information may be a message and/or symbol comprising at least one bit. The key may comprise a bit sequence and the bit sequence may comprise a TRANsmissions SECurity (TRANSEC) and/or a COMMunications SECurity (COMMSEC) bit sequence.

According to still more embodiments of the present invention, the Time-of-Day (TOD) value may be based upon GPS. Generating the at least one alphabet may comprise using a predetermined algorithm and/or look-up table.

According to yet more embodiments of the present invention, an element of the plurality of elements may be based upon a plurality of time-domain and/or frequency-domain values, wherein a time-domain and/or frequency-domain value of the plurality of time-domain and/or frequency-domain values may be real, imaginary and/or complex.

According to further embodiments of the present invention, the synthesizing may comprise synthesizing a direct waveform devoid of a frequency translation, wherein the direct waveform synthesizing may be used to generate the at least one alphabet. The direct waveform synthesis may comprise at least one pseudo-random generator, filter, Analog-to-Digital (A/D) converter, Digital-to-Analog (D/A) converter, Fourier transform, inverse Fourier transform and/or orthogonalizer. The Fourier transform may be a Discrete Fourier Transform (DFT) and/or a Fast Fourier Transform (FFT) and the inverse Fourier transform may be an Inverse Discrete Fourier Transform (IDFT) and/or an Inverse Fast Fourier Transform (IFFT). The orthogonalizer may be a Gram-Schmidt orthogonalizer.

According to still further embodiments of the present invention, the at least one alphabet may comprise at least two alphabets. The at least one alphabet may be used over a first time interval and not used over a second time interval. The first time interval may be associated with a Time-of-Day (TOD) value, message, symbol and/or bit. According to the method, at least one second alphabet may be used over the second time interval. Further according to the method, the at least one alphabet and the at least one second alphabet may be different therebetween, wherein different may comprise a difference in a time-domain and/or frequency-domain characteristic.

According to embodiments of the present invention, the method further comprises transmitting at least one second waveform during a time interval that is not associated with communicating information, wherein the at least one second waveform may be devoid of a cyclostationary property and may comprise a frequency content that is substantially the same as a frequency content of the waveform. The frequency content may be a power spectral density.

According to the method, transmitting may be performed by a transmitter that is fixed, mobile, portable, transportable, installed in a vehicle and/or installed in a satellite. The vehicle may be a land-mobile vehicle, a maritime vehicle, an aeronautical vehicle and/or an unmanned vehicle. Further according to the method, devoid of a cyclostationary property may comprise devoid of a chipping rate. The method may further comprise use of Forward Error Correction (FEC) encoding, bit repetition, bit interleaving, bit-to-symbol conversion, symbol repetition, symbol interleaving, symbol-to-waveform mapping, waveform repetition and/or waveform interleaving and communicating information according to the method may comprise communicating information wirelessly. In some embodiments, communicating information comprises communicating spread-spectrum information.

Still further according to the method, the waveform may comprise a first plurality of frequencies over a first time interval and a second plurality of frequencies over a second time interval, wherein the first plurality of frequencies differ from the second plurality of frequencies in at least one frequency. At least some frequencies of the first and/or second plurality of frequencies may also used by a second transmitter. The second transmitter may be a transmitter of a commercial communications system.

According to embodiments of the present invention, the at least one alphabet may be used deterministically and/or pseudo-randomly, wherein used deterministically and/or pseudo-randomly may comprise usage of the at least one alphabet responsive to a Time-of-Day (TOD) value, a pseudo-random selection and/or a usage of one or more alphabets other than the at least one alphabet. According to some embodiments of the present invention, usage comprises usage of at least one element of the plurality of elements of the at least one alphabet. According to other embodiments of the present invention, a synthesis associated with the waveform is substantially devoid of a frequency translation.

In some embodiments, the synthesis includes a plurality of operations that are used to form the waveform, the plurality of operations not including a frequency translation and wherein the transmitter transmits the waveform without subjecting the waveform to a frequency translation. In some embodiments, the plurality of operations may include generating values pseudo-randomly, a Fourier transform, a Discrete Fourier Transform (DFT), a Fast Fourier Transform (FFT), an inverse Fourier transform, an Inverse Discrete Fourier Transform (IDFT), an Inverse Fast Fourier Transform (IFFT), Forward Error Correction (FEC) encoding, bit interleaving, bit-to-symbol conversion, symbol interleaving, symbol-to-waveform mapping, waveform repetition, filtering, amplification and/or waveform interleaving. Generating values pseudo-randomly may comprise generating at least one value responsive to a Time-of-Day (TOD) value and/or a key input.

In further embodiments according to the method, generating at least one value pseudo-randomly comprises generating at least one value based upon at least one statistical distribution. The at least one statistical distribution may comprise a Normal/Gaussian, Bernoulli, Geometric, Pascal/Negative Binomial, Exponential, Erlang, Weibull, Chi-Squared, F, Student's t, Rise, Pareto, Poisson, Binomial, Uniform, Gamma, Beta, Laplace, Cauchy, Rayleigh, Maxwell and/or any other distribution. The at least one statistical distribution may be truncated. The at least one value may be a time-domain and/or frequency-domain value. The at least one value may be real, imaginary and/or complex and, according to some embodiments of the invention, the at least one value is based upon at least one statistical distribution.

According to the method, the at least one statistical distribution may comprise a Normal/Gaussian, Bernoulli, Geometric, Pascal/Negative Binomial, Exponential, Erlang, Weibull, Chi-Squared, F, Student's t, Rise, Pareto, Poisson, Binomial, Uniform, Gamma, Beta, Laplace, Cauchy, Rayleigh, Maxwell and/or any other distribution. The at least one statistical distribution may be truncated.

According to embodiments of the invention, a method of communicating information may comprise transmitting and/or receiving a spread-spectrum waveform that is substantially devoid of a chipping rate.

According to some other embodiments of the invention, a method of receiving information may comprise receiving a measure of a spread-spectrum waveform that is substantially devoid of a chipping rate.

According to some more embodiments of the invention, a method of communicating information is provided, the method comprising transmitting and/or receiving a waveform that is substantially Gaussian distributed.

According to some additional embodiments of the present invention, a method of receiving information is provided, the method comprising receiving a measure of a waveform that is substantially Gaussian distributed.

According to still more embodiments of the present invention, a method of communicating information is provided, the method comprising transmitting a waveform that does not include a cyclostationary signature.

According to yet more embodiments of the present invention, a method of receiving information from a transmitter is provided, the method comprising receiving a measure of a waveform that does not include a cyclostationary signature, wherein the waveform that does not include a cyclostationary signature has been transmitted by the transmitter.

According to further embodiments of the present invention, a method of transmitting information is provided, the method comprising mapping an information sequence onto a waveform sequence, wherein the waveform sequence is substantially devoid of a cyclostationary signature.

According to still further embodiments, a method of receiving information is provided, the method comprising mapping a waveform sequence that is substantially devoid of a cyclostationary signature onto an information sequence.

According to some embodiments of the present invention, a method of providing information is provided, the method comprising processing a waveform that is substantially devoid of a cyclostationary property.

According to some more embodiments of the present invention, a method of receiving information from a transmitter is provided, the method comprising receiving a measure of a signal that is based upon at least one statistical distribution, wherein the transmitter synthesizes at least one alphabet based upon the at least one statistical distribution and transmits the signal based upon the at least one alphabet.

According to some other embodiments of the present invention, a method of transmitting a signal is provided, the method comprising wirelessly transmitting a signal that is based upon at least one alphabet, wherein the at least one alphabet is based upon at least one statistical distribution. The at least one statistical distribution may comprise a Normal/Gaussian, Bernoulli, Geometric, Pascal/Negative Binomial, Exponential, Erlang, Weibull, Chi-Squared, F, Student's t, Rise, Pareto, Poisson, Binomial, Uniform, Gamma, Beta, Laplace, Cauchy, Rayleigh, Maxwell and/or any other distribution. The at least one statistical distribution may be truncated. The at least one alphabet may comprise a plurality of elements and at least a first and second element of the plurality of elements may be substantially orthogonal therebetween, wherein substantially orthogonal may comprise substantially orthonormal.

According to embodiments of the invention, a method of processing a waveform may comprise transmitting and/or receiving the waveform, wherein the waveform is based upon at least one alphabet, the at least one alphabet is based upon at least one statistical distribution and the waveform and/or the at least one alphabet is/are substantially devoid of a cyclostationary signature and/or chipping rate. The at least one statistical distribution may comprise a Normal/Gaussian, Bernoulli, Geometric, Pascal/Negative Binomial, Exponential, Erlang, Weibull, Chi-Squared, F, Student's t, Rise, Pareto, Poisson, Binomial, Uniform, Gamma, Beta, Laplace, Cauchy, Rayleigh, Maxwell and/or any other distribution. In some embodiments, the at least one statistical distribution may be truncated.

According to some other embodiments of the present invention, the at least one alphabet may comprise a plurality of elements and at least a first and second element of the plurality of elements may be substantially orthogonal therebetween, wherein substantially orthogonal may comprise substantially orthonormal. The processing may include a plurality of operations and may be substantially devoid of a frequency translation. According to still more embodiments of the present invention, the plurality of operations may include generating values pseudo-randomly, a Fourier transform, a Discrete Fourier Transform (DFT), a Fast Fourier Transform (FFT), an inverse Fourier transform, an Inverse Discrete Fourier Transform (IDFT), an Inverse Fast Fourier Transform (IFFT), Forward Error Correction (FEC) encoding, bit interleaving, bit-to-symbol conversion, symbol interleaving, symbol-to-waveform mapping, waveform repetition, filtering, amplification and/or waveform interleaving.

According to yet more embodiments of the present invention, generating values pseudo-randomly may comprise generating at least one value responsive to a Time-of-Day (TOD) value and/or a key input, wherein generating at least one value may comprise generating at least one value based upon at least one statistical distribution. In some embodiments, the at least one statistical distribution comprises a Normal/Gaussian, Bernoulli, Geometric, Pascal/Negative Binomial, Exponential, Erlang, Weibull, Chi-Squared, F, Student's t, Rise, Pareto, Poisson, Binomial, Uniform, Gamma, Beta, Laplace, Cauchy, Rayleigh, Maxwell and/or any other distribution.

According to further embodiments of the present invention, the at least one statistical distribution may be truncated.

According to still further embodiments of the present invention, the at least one value may be a time-domain and/or frequency-domain value, wherein the at least one value may be real, imaginary and/or complex. The at least one value may be based upon at least one statistical distribution.

Transmitting and/or receiving may comprise wirelessly transmitting and/or receiving. According to some embodiments of the present invention, transmitting and/or receiving may comprise transmitting and/or receiving at a space-based component, at a land-mobile vehicle, at a maritime vehicle, at an aeronautical vehicle, at an un-manned vehicle and/or at a user device, wherein the user device may be fixed, mobile, portable, transportable and/or installed in a vehicle.

Wirelessly transmitting and/or receiving may be based upon frequencies that are used by a plurality of transmitters, wherein first and second transmitters of the plurality of transmitters may respectively be associated with first and second systems. In some embodiments, at least one system of the first and second systems is a commercial system.

Embodiments according to the invention can provide methods and/or transmitters for communicating information based upon a waveform that is substantially devoid of a cyclostationary property. Pursuant to these embodiments, a method/transmitter can be provided comprising at least one waveform alphabet including a plurality of elements, wherein the waveform that is substantially devoid of a cyclostationary property includes at least one element of the plurality of elements of the at least one waveform alphabet.

In some embodiments according to the invention, the at least one waveform alphabet is generated based upon at least one statistical distribution responsive to a key and/or Time-of-Day (TOD) value.

In some embodiments according to the invention, communicating information comprises associating a measure of information with at least one element of the at least one waveform alphabet. In some embodiments according to the invention, the measure of information is a message and/or symbol comprising at least one bit.

In some embodiments according to the invention, at least first and second elements of the plurality of elements are substantially orthogonal therebetween, wherein substantially orthogonal may, in some embodiments, comprise substantially orthonormal.

In some embodiments according to the invention, the at least one statistical distribution comprises a Normal/Gaussian, Bernoulli, Geometric, Pascal/Negative Binomial, Exponential, Erlang, Weibull, Chi-Squared, F, Student's t, Rise, Pareto, Poisson, Binomial, Uniform, Gamma, Beta, Laplace, Cauchy, Rayleigh, Maxwell and/or any other distribution. In further embodiments, the at least one statistical distribution is truncated.

In some embodiments according to the invention, a method and/or transmitter can be provided comprising a synthesis component and a transmission component, wherein the synthesis component synthesizes at least one alphabet based upon at least one statistical distribution and the transmission component transmits a waveform based upon the at least one alphabet. In some embodiments, the waveform is devoid of a cyclostationary property. In other embodiments, the at least one alphabet comprises a plurality of elements, with each element of the plurality of elements being devoid of a cyclostationary property. In still other embodiments, the synthesis component is a direct synthesis component that does not include a frequency translation function and/or the transmission component does not include a frequency translation function.

Embodiments of the present invention have been described above in terms of systems, methods, devices and/or computer program products that provide communications devoid of cyclostationary features. However, other embodiments of the present invention may selectively provide communications devoid of cyclostationary features. For example, if LPI/LPD/LPE and/or minimum interference communications are desired, then non-cyclostationary waveforms may be transmitted. However, when LPI/LPD/LPE and/or minimum interference communications need not be transmitted, cyclostationary waveforms may be used. An indicator may be provided to allow a receiver/transmitter to determine whether cyclostationary or non-cyclostationary waveforms are being transmitted or may be transmitted. Accordingly, a given system, method, device and/or computer program can operate in one of two modes, depending upon whether LPI/LPD/LPE and/or minimum interference communications are desired, and/or based on other parameters and/or properties of the communications environment.

DESCRIPTION OF EMBODIMENTS ACCORDING TO THE INVENTION

Figure 1:
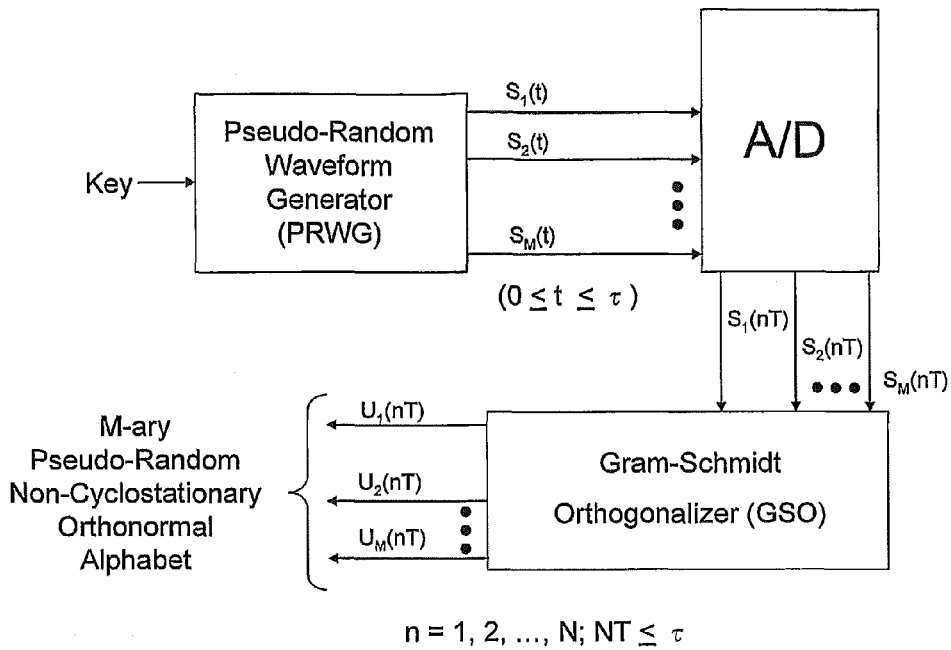
FIG. 1 is a schematic illustration of functions of a transmitter according to embodiments of the present invention.

Specific exemplary embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. It will be understood that two or more embodiments of the present invention as presented herein may be combined in whole or in part to form one or more additional embodiments.

It will be understood that when an element is referred to as being "connected" or "coupled" to another element, it can be directly connected or coupled to the other element or intervening elements may be present. Furthermore, "connected" or "coupled" as used herein may include wirelessly connected or coupled.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms first and second are used herein to describe various elements, these elements should not be limited by these terms. These terms are only used to distinguish one element from another element. Thus, a first element below could be termed a second element, and similarly, a second element may be termed a first element without departing from the teachings of the present invention. As used herein, the term "and/or" includes any and all combinations of one or more of the associated listed items. The symbol "/" is also used as a shorthand notation for "and/or".

Moreover, as used herein the term "substantially the same" means that two or more entities that are being compared have common features/characteristics (e.g., are based upon a common kernel) but may not be identical. For example, substantially the same bands of frequencies, means that two or more bands of frequencies being compared substantially overlap, but that there may be some areas of non-overlap, for example at a band end. As another example, substantially the same air interfaces means that two or more air interfaces being compared are similar but need not be identical. Some differences may exist in one air interface (e.g., a satellite air interface) relative to another (e.g., a terrestrial air interface) to account for one or more different characteristics that may exist between the terrestrial and satellite communications environments. For example, a different vocoder rate may be used for satellite communications compared to the vocoder rate that may be used for terrestrial communications (i.e., for terrestrial communications, voice may be compressed ("vocoded") to approximately 9 to 13 kbps, whereas for satellite communications a vocoder rate of approximately 2 to 4 kbps, for example, may be used); a different forward error correction coding, different interleaving depth, and/or different spread-spectrum codes may also be used, for example, for satellite communications compared to the coding, interleaving depth, and/or spread spectrum codes (i.e., Walsh codes, long codes, and/or frequency hopping codes) that may be used for terrestrial communications.

The term "truncated" as used herein to describe a statistical distribution means that a random variable associated with the statistical distribution is precluded from taking-on values over one or more ranges. For example, a Normal/Gaussian distribution that is not truncated, allows an associated random variable to take-on values ranging from negative infinity to infinity with a frequency (i.e., probability) as determined by the Normal/Gaussian probability density function. In contrast, a truncated Normal/Gaussian distribution may allow an associated random variable to take-on non-zero values ranging from, for example, $V_1$ to $V_2$ ($-\infty < V_1, V_2 < \infty$) in accordance with a Normal/Gaussian distribution, and preclude the random variable from taking-on non-zero values outside the range from $V_1$ to $V_2$. Furthermore, a truncated distribution may allow an associated random variable to take-on non-zero values over a plurality of ranges (that may be a plurality of non-contiguous ranges) and preclude the random variable from taking-on non-zero values outside of the plurality of ranges.

As used herein, the term "transmitter" and/or "receiver" include(s) transmitters/receivers of cellular and/or satellite terminals with or without a multi-line display; Personal Communications System (PCS) terminals that may include data processing, facsimile and/or data communications capabilities; Personal Digital Assistants (PDA) that can include a radio frequency transceiver and/or a pager, Internet/Intranet access, Web browser, organizer, calendar and/or a Global Positioning System (GPS) receiver; and/or conventional laptop and/or palmtop computers or other appliances, which include a radio frequency transceiver. As used herein, the term "transmitter" and/or "receiver" also include(s) any other radiating device, equipment and/or source that may have time-varying and/or fixed geographic coordinates and/or may be portable, transportable, installed in a vehicle (aeronautical, maritime, or land-based) and/or situated/configured to operate locally and/or in a distributed fashion at any location(s) on earth, vehicles (land-mobile, maritime and/or aeronautical) and/or in space. A transmitter and/or receiver also may be referred to herein as a "terminal". As used herein, the term "space-based" component and/or "space-based" system include(s) one or more satellites and/or one or more other objects and/or platforms (such as airplanes, balloons, unmanned vehicles, space crafts, missiles, etc.) that have a trajectory above the earth at any altitude.

Some embodiments of the present invention may arise from recognition that it may be desirable to communicate information based upon a waveform that is substantially devoid of a cyclostationary property. As used herein to describe a waveform, the term "cyclostationary" means that the waveform comprises at least one repeating signature/pattern. Examples of a repeating signature/pattern are a bit rate, a symbol rate, a chipping rate and/or a pulse shape (e.g., a Nyquist pulse shape) that may be associated with a bit/symbol/chip. For example, each of the well known terrestrial cellular air interfaces of GSM and CDMA (cdma2000 or W-CDMA) comprises a bit rate, a symbol rate, a chipping rate and/or a predetermined and invariant pulse shape that is associated with the bit/symbol/chip and, therefore, comprise a cyclostationary property/signature. In contrast a waveform that represents a random (or pseudo-random) noise process does not comprise a bit rate, a symbol rate, a chipping rate and/or a predetermined and invariant pulse shape and is, therefore, substantially devoid of a cyclostationary property/signature. According to some embodiments of the present invention, non-cyclostationary waveforms may be used, particularly in those situations where LPI, LPD, LPE and/or minimum interference communications are desirable.

Conventional communications systems use waveforms that are substantially cyclostationary. This is primarily due to a methodology of transmitting information wherein a unit of information (i.e., a specific sequence of one or more bits) is mapped into (i.e., is associated with) a specific waveform shape (i.e., a pulse) and the pulse is transmitted by a transmitter in order to convey to a receiver the unit of information. Since there is typically a need to transmit a plurality of units of information in succession, a corresponding plurality of pulses are transmitted in succession. Any two pulses of the plurality of pulses may be different therebetween by an amplitude (i.e., sign and/or magnitude), but a waveform shape that is associated with any one pulse of the plurality of pulses remains substantially invariant from pulse to pulse and a rate of pulse transmission also remains substantially invariant (at least over a time interval). The methodology of transmitting (digital) information as described above has its origins in and is motivated by the way Morse code evolved and was used to transmit information. Furthermore, the methodology yields relatively simple transmitter/receiver implementations and has thus been adopted widely by many communications systems. However, the methodology suffers from generating cyclostationary features/signatures that are undesirable if LPE/LPI/LPD and/or minimum interference communications are desirable. Embodiments of the present invention arise from recognition that communications systems may be based on a different methodology that is substantially devoid of transmitting a modulated carrier, a sequence of substantially invariant pulse shapes and/or a chipping rate and that even spread-spectrum communications systems may be configured to transmit/receive spread-spectrum information using waveforms that are devoid of a chipping rate.

A publication by W. A. Gardner, entitled "*Signal Interception: A Unifying Theoretical Framework for Feature Detection,*" IEEE Transactions on Communications, Vol. 36, No. 8, August 1988, notes in the Abstract thereof that the unifying framework of the spectral correlation theory of cyclostationary signals is used to present a broad treatment of weak random signal detection for interception purposes. The relationships among a variety of previously proposed ad hoc detectors, optimum detectors, and newly proposed detectors are established. The spectral-correlation-plane approach to the interception problem is put forth as especially promising for detection, classification, and estimation in particularly difficult environments involving unknown and changing noise levels and interference activity. A fundamental drawback of the popular radiometric methods in such environments is explained. According to some embodiments of the invention, it may be desirable to be able to communicate information using waveforms that do not substantially include a cyclostationary feature/signature in order to further reduce the probability of intercept/detection/exploitation of a communications system/waveform that is intended for LPI/LPD/LPE communications.

There are at least two potential advantages associated with signal detection, identification, interception and/or exploitation based on cyclic spectral analysis compared with the energy detection (radiometric) method: (1) A cyclic signal feature (i.e., chip rate and/or symbol rate) may be discretely distributed even if a signal has continuous distribution in a power spectrum. This implies that signals that may have overlapping and/or interfering features in a power spectrum may have a non-overlapping and distinguishable feature in terms of a cyclic characteristic. (2) A cyclic signal feature associated with a signal's cyclostationary property, may be identified via a "cyclic periodogram." The cyclic periodogram of a signal is a quantity that may be evaluated from time-domain samples of the signal, a frequency-domain mapping such as, for example, a Fast Fourier Transform (FFT), and/or discrete autocorrelation operations. Since very large point FFTs and/or autocorrelation operations may be implemented using Very Large Scale Integration (VLSI) technologies, Digital Signal Processors (DSPs) and/or other modern technologies, a receiver of an interceptor may be configured to perform signal Detection, Identification, Interception and/or Exploitation (D/I/I/E) based on cyclic feature detection processing.

Given the potential limitation(s) of the radiometric approach and the potential advantage(s) of cyclic feature detection technique(s) it is reasonable to expect that a sophisticated interceptor may be equipped with a receiver based on cyclic feature detection processing. It is, therefore, of potential interest and potential importance to develop communications systems capable of communicating information devoid of cyclostationary properties/signatures to thereby render cyclic feature detection processing by an interceptor substantially ineffective.

FIG. 1 illustrates embodiments of generating a communications alphabet comprising M distinct pseudo-random, non-cyclostationary, orthogonal and/or orthonormal waveforms. As illustrated in FIG. 1, responsive to a "key" input (such as, for example, a TRANsmissions SECurity (TRANSEC) key input, a COMMunications SECurity (COMMSEC) key input and/or any other key input), a Pseudo-Random Waveform Generator (PRWG) may be used to generate a set of M distinct pseudo-random waveforms, which may, according to some embodiments of the invention, represent M ensemble elements of a Gaussian-distributed random (or pseudo-random) process. The M distinct pseudo-random waveforms (i.e., the M ensemble elements) may be denoted as $\{S(t)\}=\{S_1(t), S_2(t), \ldots, S_M(t)\}$; $0 \leq t \leq \tau$. The set of waveforms $\{S(t)\}$ may be a band-limited set of waveforms having a one-sided bandwidth less than or equal to B Hz. As such, a number of distinct orthogonal and/or orthonormal waveforms that may be generated from the set $\{S(t)\}$ may, in accordance with established Theorems, be upper-bounded by $C\tau B$, where $C \geq 2$ (see, for example, P. M. Dollard, "*On the time-bandwidth concentration of signal functions forming given geometric vector configurations,*" IEEE Transactions on Information Theory, IT-10, pp. 328-338, October 1964; also see H. J. Landau and H. O. Pollak, "*Prolate spheroidal wave functions, Fourier analysis and uncertainty—III: The dimension of the space of essentially time- and band-limited signals,*" Bell System Technical Journal, 41, pp. 1295-1336, July 1962). It will be understood that in some embodiments of the present invention, the key input may not be used and/or may not exist. In such embodiments, one or more Time-of-Day (TOD) values may be used instead of the key input. In other embodiments, a key input and one or more TOD values may be used. In still other embodiments, yet other values may be used.

Figure 2:
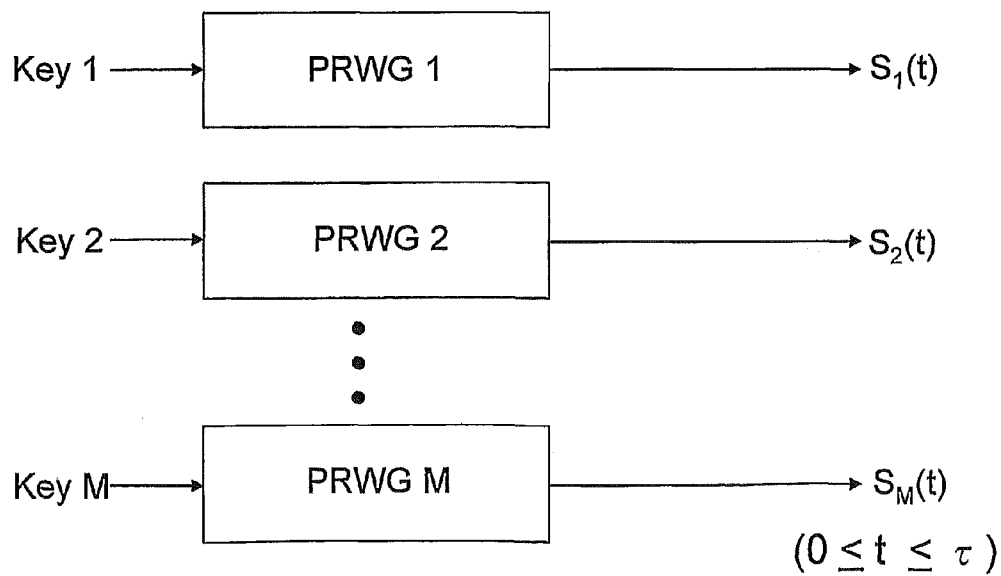
FIG. 2 is a schematic illustration of further functions of a transmitter according to further embodiments of the present invention.
Figure 3:
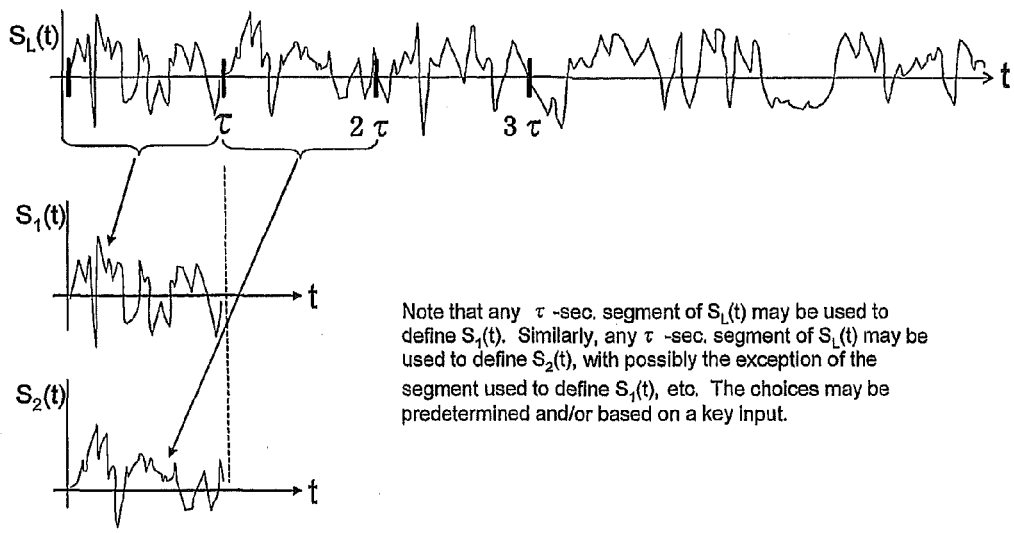
FIG. 3 is a schematic illustration of waveform generation according to additional embodiments of the present invention.

In accordance with some embodiments of the present invention, the $j^{th}$ element of the set of waveforms $\{S(t)\}$, $S_j(t)$; $j=1, 2, \ldots, M$; may be generated by a respective $j^{th}$ PRWG in response to a respective $j^{th}$ key input and/or TOD value, as illustrated in FIG. 2. In some embodiments according to FIG. 2, each of the PRWG is the same PRWG and each key differs relative to each other key. In other embodiments, each key is the same key and each PRWG differs relative to each other PRWG. In further embodiments of FIG. 2, each key differs relative to each other key and each PRWG also differs relative to each other PRWG. Other combinations and sub-combinations of these embodiments may be provided. In still other embodiments, a single PRWG and a single key may be used to generate a "long" waveform $S_L(t)$ which may be segmented into M overlapping and/or non-overlapping components to form a set of waveforms $\{S(t)\}$, as illustrated in FIG. 3.

In some embodiments of the invention, a new set of waveforms $\{S(t)\}$ may be formed periodically, non-periodically, periodically over a first time interval and non-periodically over a second time interval and/or periodically but with a jitter imposed on a periodicity interval, responsive one or more TOD values that may, for example, be derived from processing of Global Positioning System (GPS) signals, and/or responsive to a transmission of a measure of at least one of the elements of $\{S(t)\}$. In some embodiments, a processor may be operatively configured as a background operation, generating new sets of waveforms $\{S(t)\}$, and storing the new sets of waveforms $\{S(t)\}$ in memory to be accessed and used as needed. In further embodiments, a used set of waveforms $\{S(t)\}$ may be discarded and not used again, whereas in other embodiments, a used set of waveforms $\{S(t)\}$ may be placed in memory to be used again at a later time. In some embodiments, some sets of waveforms $\{S(t)\}$ are used once and then discarded, other sets of waveforms $\{S(t)\}$ are not used at all, and still other sets of waveforms $\{S(t)\}$ are used more than once. Finally, in some embodiments, the waveform duration $\tau$ and/or the waveform bandwidth B may vary between different sets of waveforms, transmission intervals and/or elements of a given set of waveforms.

Still referring to FIG. 1, the set of substantially continuous-time waveforms $\{S(t)\}=\{S_1(t), S_2(t), \ldots, S_M(t)\}$; $0 \leq t \leq \tau$; may, according to some embodiments of the present invention, be transformed from a substantially continuous-time representation to a substantially discrete-time representation using, for example, one or more Analog-to-Digital (A/D) converters and/or one or more Sample-and-Hold (S/H) circuits, to generate a corresponding substantially discrete-time set of waveforms $\{S(nT)\}=\{S_1(nT), S_2(nT), \ldots, S_M(nT)\}$; $n=1, 2, \ldots, N$; $nT \leq \tau$. A Gram-Schmidt orthogonalizer and/or orthonormalizer and/or any other orthogonalizer and/or orthonormalizer, may then be used, as illustrated in FIG. 1, to generate a set of waveforms $\{U(nT)\}=\{U_1(nT), U_2(nT), \ldots, U_M(nT)\}$; $n=1, 2, \ldots, N$; $nT \leq \tau$ that are orthogonal and/or orthonormal therebetween. The GSO and/or other orthogonalization and/or orthonormalization procedure(s) are known to those skilled in the art and need not be described further herein (see, for example, Simon Haykin, "*Adaptive Filter Theory,*" at 173, 301, 497; 1986 by Prentice-Hall; and Bernard Widrow and Samuel D. Stearns "*Adaptive Signal Processing,*" at 183; 1985 by Prentice-Hall, Inc.).

It will be understood that the sampling interval T may be chosen in accordance with Nyquist sampling theory to thereby preserve by the discrete-time waveforms $\{S(nT)\}$ all, or substantially all, of the information contained in the continuous-time waveforms {S(t)}. It will also be understood that, in some embodiments of the invention, the sampling interval T may be allowed to vary over the waveform duration τ, between different waveforms of a given set of waveforms and/or between different sets of waveforms. Furthermore, the waveform duration τ may be allowed to vary, in some embodiments, between different waveforms of a given set of waveforms and/or between different sets of waveforms. In some embodiments of the present invention, $\{S(nT)\}=\{S_1(nT), S_2(nT), \ldots, S_M(nT)\}$; n=1, 2, . . . , N; nT≤τ may be generated directly in a discrete-time domain by configuring one or more Pseudo-Random Number Generators (PRNG) to generate $S_j(nT)$; n=1, 2, . . . , N; nT≤τ for each value of j (j=1, 2, . . . , M). The one or more PRNG may be configured to generate $S_j(nT)$; n=1, 2, . . . , N; j=1, 2, . . . , M, based upon at least one statistical distribution. In some embodiments according to the present invention, the at least one statistical distribution comprises a Normal/Gaussian, Bernoulli, Geometric, Pascal/Negative Binomial, Exponential, Erlang, Weibull, Chi-Squared, F, Student's t, Rise, Pareto, Poisson, Binomial, Uniform, Gamma, Beta, Laplace, Cauchy, Rayleigh, Maxwell and/or any other distribution. In further embodiments, the at least one statistical distribution is truncated. In still further embodiments, the at least one statistical distribution depends upon a value of the index j and/or n (i.e., the at least one statistical distribution is a function of (j, n)).

In still further embodiments of the present invention, {S(nT)} may be generated by configuring one or more PRNG to generate real, imaginary and/or complex values that are then subjected to a linear and/or non-linear transformation to generate $S_j(nT)$; n=1, 2, . . . , N; j=1, 2, . . . , M. In some embodiments of the present invention, the transformation comprises a Fourier transformation. In further embodiments, the transformation comprises an inverse Fourier transformation. In still further embodiments, the transformation comprises an Inverse Fast Fourier Transformation (IFFT). The real, imaginary and/or complex values may be based upon at least one statistical distribution. The at least one statistical distribution may comprise a Normal/Gaussian, Bernoulli, Geometric, Pascal/Negative Binomial, Exponential, Erlang, Weibull, Chi-Squared, F, Student's t, Rise, Pareto, Poisson, Binomial, Uniform, Gamma, Beta, Laplace, Cauchy, Rayleigh, Maxwell and/or any other distribution and the at least one statistical distribution may be truncated. In still further embodiments, the at least one statistical distribution depends upon a value of the index j and/or n (i.e., the at least one statistical distribution is a function of (j, n)).

Figure 4:
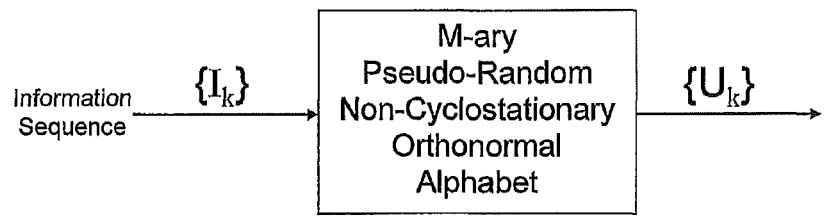
FIG. 4 is a schematic illustration of further functions of a transmitter according to further embodiments of the present invention.

The set $\{U(nT)\}=\{U_1(nT), U_2(nT), \ldots, U_M(nT)\}$; n=1, 2, . . . , N; NT≤τ, may be used, in some embodiments of the present invention, to define an M-ary pseudo-random and non-cyclostationary alphabet. As illustrated in FIG. 4, an information symbol $I_k$, occurring at a discrete time k (for example, at t=kτ or, more generally, if the discrete time epochs/intervals are variable, at t=τ$_k$), and having one of M possible information values, $\{I_1, I_2, \ldots, I_M\}$, may be mapped onto one of the M waveforms of the alphabet $\{U_1(nT), U_2(nT), \ldots, U_M(nT)\}$; n=1, 2, . . . , N; NT≤τ. For example, in some embodiments, if $I_k=I_2$, then during the $k^{th}$ signaling interval the waveform $U_2(nT)$ may be transmitted; n=1, 2, . . . , N; NT≤τ. It will be understood that transmitting the waveform $U_2(nT)$ comprises transmitting substantially all of the elements (samples) of the waveform $U_2(nT)$ wherein substantially all of the elements (samples) of the waveform $U_2(nT)$ means transmitting $U_2(T), U_2(2T), \ldots,$ and $U_2(NT)$. Furthermore, it will be understood that any unambiguous mapping between the M possible information values of $I_k$ and the M distinct waveforms of the M-ary alphabet, $\{U_1(nT), U_2(nT), \ldots, U_M(nT)\}$, may be used to communicate information to a receiver (destination) provided that the receiver also has knowledge of the mapping. It will also be appreciated that the ordering or indexing of the alphabet elements and the unambiguous mapping between the M possible information values of $I_k$ and the M distinct waveforms of the M-ary alphabet may be arbitrary, as long as both transmitter (source) and receiver (destination) have knowledge of the ordering and mapping.

In some embodiments of the invention, the information symbol $I_k$, may be constrained to only two possible values (binary system). In such embodiments of the invention, the M-ary alphabet may be a binary (M=2) alphabet comprising only two elements, such as, for example, $\{U_1(nT), U_2(nT)\}$. In other embodiments of the invention, while an information symbol, $I_k$, is allowed to take on one of M distinct values (M≥2) the alphabet comprises more than M distinct waveforms, that may, according to embodiments of the invention be orthogonal/orthonormal waveforms, $\{U_1(nT), U_2(nT), \ldots, U_L(nT)\}$; L>M, to thereby increase a distance between a set of M alphabet elements that are chosen and used to communicate information and thus allow an improvement of a communications performance measure such as, for example, an error rate, a propagations distance and/or a transmitted power level. It will be understood that in some embodiments, the number of distinct values that may be made available to an information symbol to thereby allow the information symbol to communicate one or more bits of information, may be reduced or increased responsive to a channel state such as, for example an attenuation, a propagation distance and/or an interference level. In further embodiments, a number of distinct elements comprising an alphabet may also change responsive to a channel state. In some embodiments, as a number of information symbol states (values) decreases a number of distinct elements comprising an alphabet increases, to thereby provide further communications benefit(s) such as, for example, a lower bit error rate, a longer propagation distance, reduced transmitted power, etc.

Figure 5:
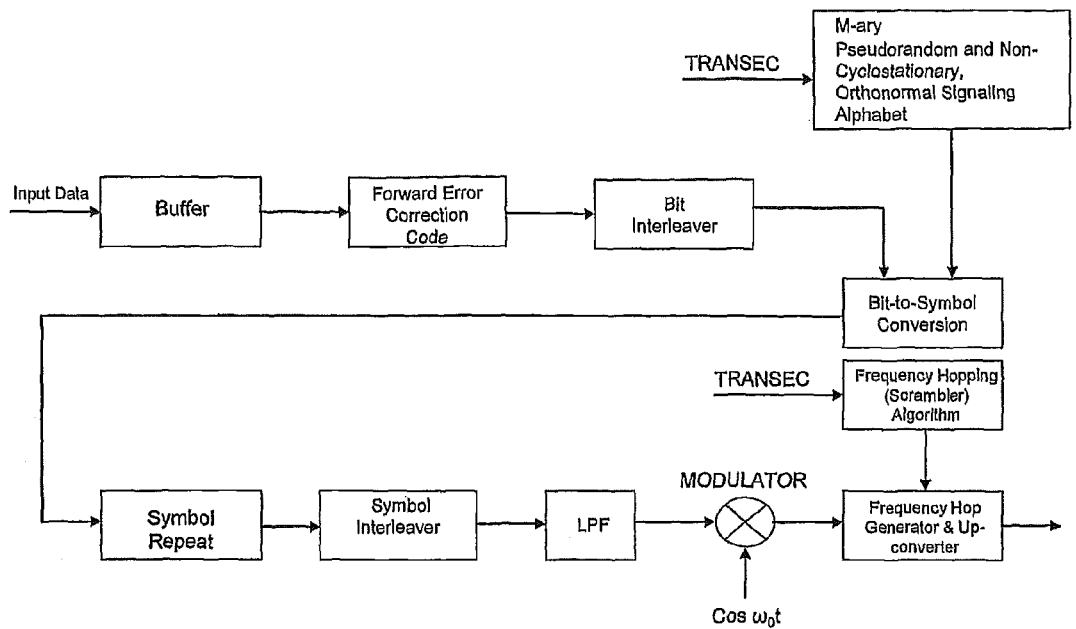
FIG. 5 is a schematic illustration of additional functions of a transmitter according to additional embodiments of the present invention.

It will be understood that at least some conventional transmitter functions comprising, for example, Forward Error Correction (FEC) encoding, interleaving, data repetition, filtering, amplification, modulation, frequency translation, scrambling, frequency hopping, etc., although not shown in FIGS. 1 through 4, may also be used in some embodiments of the present invention to configure an overall transmitter chain. At least some of these conventional transmitter functions may be used, in some embodiments, in combination with at least some of the signal processing functions of FIG. 1 through FIG. 4, to specify an overall transmitter signal processing chain. For example, an information bit sequence may be FEC encoded using, for example, a convolutional encoder, interleaved and/or bit-to-symbol converted to define a sequence of information symbols, $\{I_k\}$. The sequence of information symbols, $\{I_k\}$, may then be mapped onto a waveform sequence $\{U_k\}$, as illustrated in FIG. 4. At least some, and in some embodiments all, of the elements of the waveform sequence $\{U_k\}$ may then be repeated, at least once, to increase a redundancy measure, interleaved, filtered, frequency translated, amplified and/or frequency-hopped, for example, (not necessarily in that order) prior to being radiated by an antenna of the transmitter. An exemplary embodiment of a transmitter comprising conventional signal functions in combination with at least some of the signal processing functions of FIG. 1 through FIG. 4 is illustrated in FIG. 5.

A receiver (destination) that is configured to receive communications information from a transmitter (source) comprising functions of FIG. 1 through FIG. 4, may be equipped with sufficient information to generate a matched filter bank responsive to the M-ary alphabet $\{U_1(nT), U_2(nT), \ldots, U_M(nT)\}$ of FIG. 4. Such a receiver may be substantially synchronized with one or more transmitters using, for example, GPS-derived timing information. Substantial relative synchronism between a receiver and at least one transmitter may be necessary to reliably generate/update at the receiver the M-ary alphabet functions $\{U_1(nT), U_2(nT), \ldots, U_M(nT)\}$ and/or the matched filter bank to thereby provide the receiver with substantial optimum reception capability.

Figure 6:
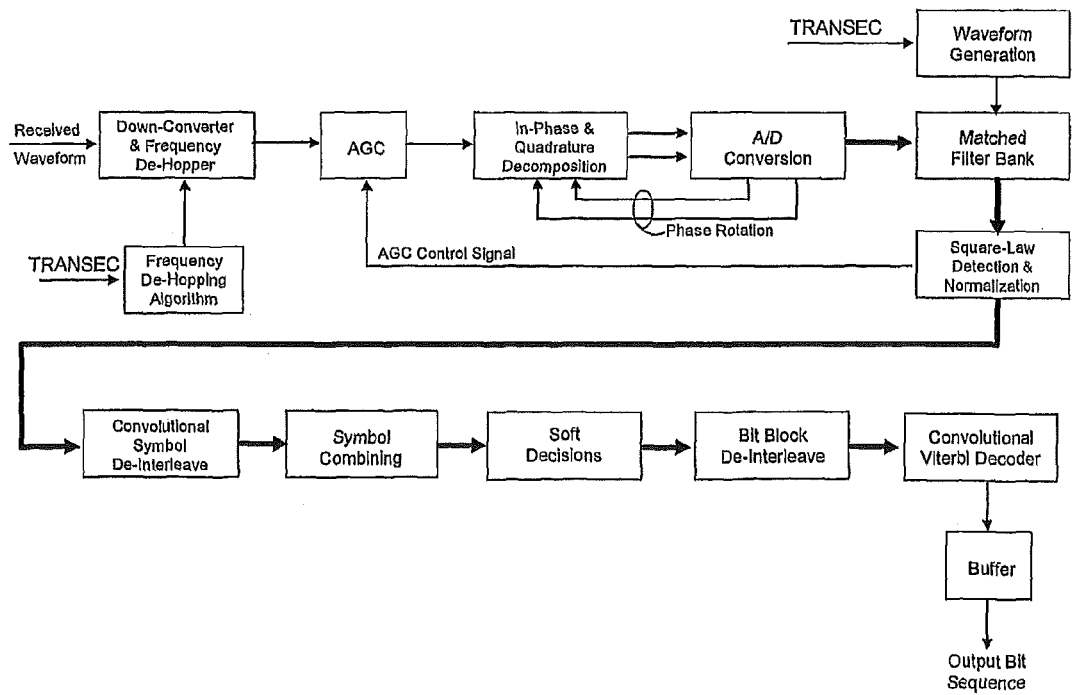
FIG. 6 is a schematic illustration of functions of a receiver according to embodiments of the present invention.

In some embodiments of the invention, all transmitters and receivers are substantially synchronized using GPS-derived timing information. It will be understood that a receiver may be provided with the appropriate key sequence(s) and the appropriate signal processing algorithms to thereby responsively form and/or update the M-ary alphabet functions and/or the matched filter bank. It will also be understood that a receiver may also be configured with an inverse of conventional transmitter functions that may be used by a transmitter. For example, if, in some embodiments, a transmitter is configured with scrambling, interleaving of data and frequency hopping, then a receiver may be configured with the inverse operations of de-scrambling, de-interleaving of data and frequency de-hopping. An exemplary embodiment of a receiver, which may correspond to the exemplary transmitter embodiment of FIG. 5, is illustrated in FIG. 6.

Figure 7:
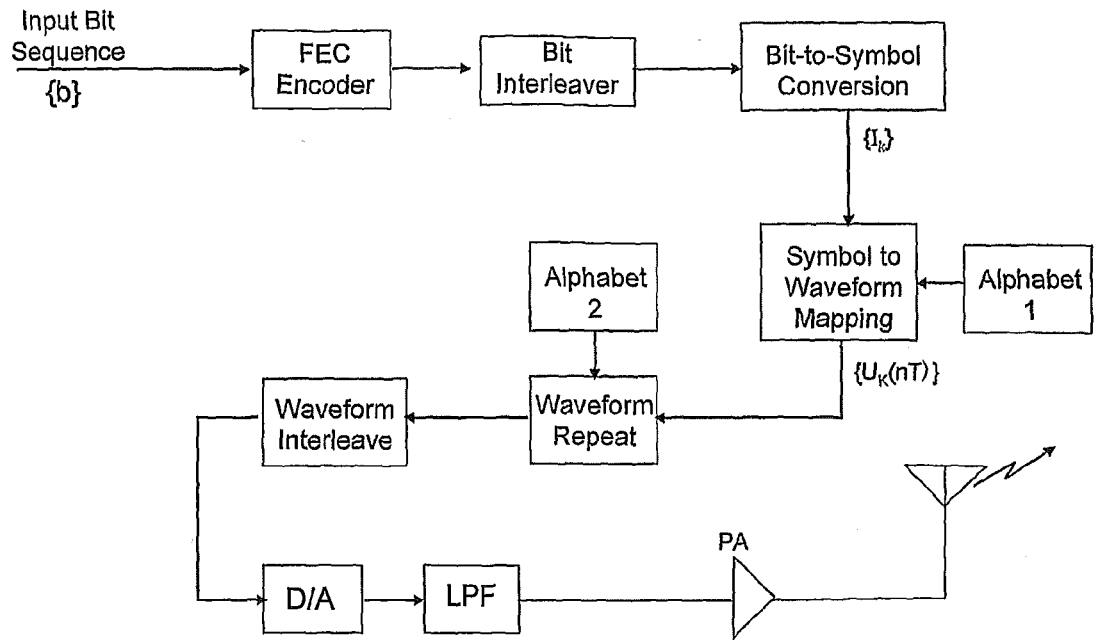
FIG. 7 is a schematic illustration of further functions of a transmitter according to further embodiments of the present invention.

FIG. 7 illustrates elements of a communications transmitter according to further embodiments of the invention. As shown in FIG. 7, following conventional operations of Forward Error Correction (FEC) encoding, bit interleaving and bit-to-symbol conversion (performed on an input bit sequence $\{b\}$ to thereby form an information symbol sequence $\{I_k\}$), the information symbol sequence $\{I_k\}$ is mapped onto a non-cyclostationary waveform sequence $\{U_k(nT)\}$ using a first M-ary non-cyclostationary orthonormal alphabet (Alphabet 1). An element of $\{U_k(nT)\}$ may then be repeated (at least once), as illustrated in FIG. 7, using a second M-ary non-cyclostationary orthonormal alphabet (Alphabet 2), interleaved, transformed to a continuous-time domain representation, filtered, amplified (not necessarily in that order) and transmitted. The repeat of an element of $\{U_k(nT)\}$ may be performed using a different alphabet (Alphabet 2) in order to reduce or eliminate a cyclostationary feature/signature in the transmitted waveform. For at least the same reason, the at least two alphabets of FIG. 7 may be replaced by new alphabets following the transmission of a predetermined number of waveform symbols. In some embodiments, the predetermined number of waveform symbols is one. As stated earlier, a large reservoir of alphabets may be available and new alphabet choices may be made following the transmission of the predetermined number of waveform symbols and/or at predetermined TOD values.

Figure 8:
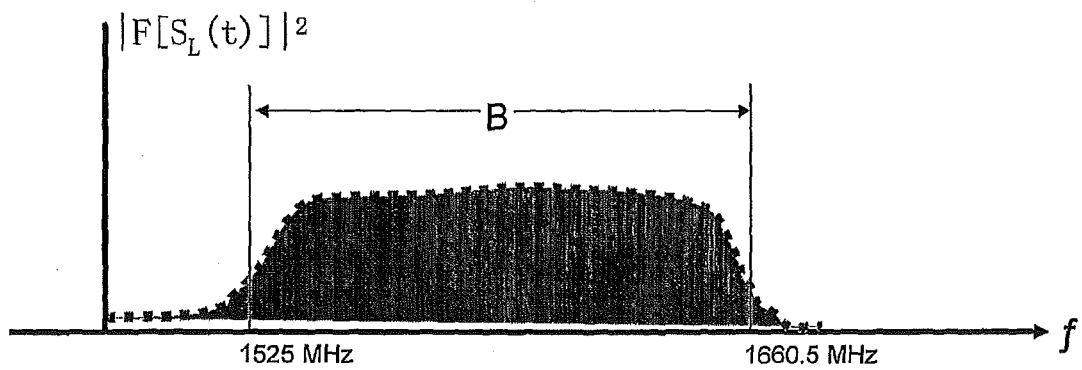
FIG. 8 is a schematic illustration of spectrum used by a transmitter according to embodiments of the present invention.
Figure 8:
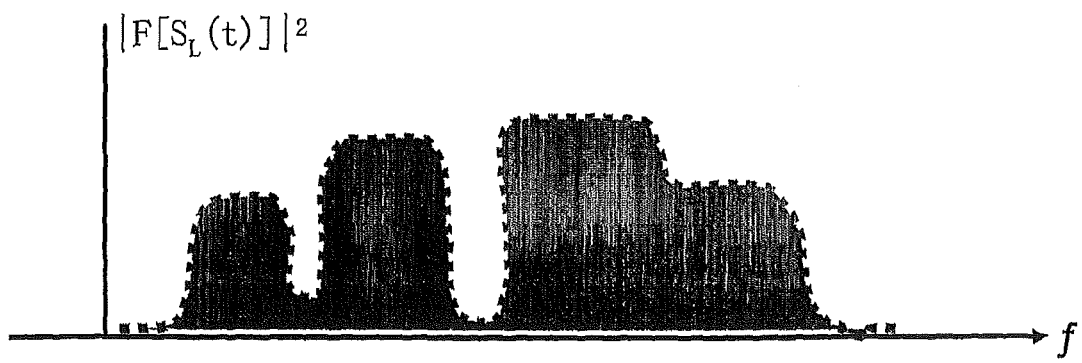

According to some embodiments of the invention, the M-ary non-cyclostationary orthonormal alphabet waveforms may be broadband waveforms as illustrated in FIG. 8. FIG. 8 illustrates a power spectral density of a broadband waveform defining the M-ary non-cyclostationary orthonormal alphabet (such as, for example, waveform $S_L(t)$ of FIG. 3), over frequencies of, for example, an L-band (e.g., from about 1525 MHz to about 1660.5 MHz). However, FIG. 8 is for illustrative purposes only and the power spectral density of $S_L(t)$ and/or any other set of waveforms used to define the M-ary non-cyclostationary orthonormal alphabet may be chosen to exist over any other frequency range and/or interval(s). In some embodiments, different alphabets may be defined over different frequency ranges/intervals (this feature may provide intrinsic frequency hopping capability). As is further illustrated in FIG. 8 (second trace), certain frequency intervals that warrant protection (or additional protection) from interference, such as, for example, a GPS frequency interval, may be substantially excluded from providing frequency content for the generation of the M-ary non-cyclostationary orthonormal alphabets. It will be appreciated that the transmitter embodiment of FIG. 7 illustrates a "direct synthesis" transmitter in that the transmitter directly synthesizes a waveform that is to be transmitted, without resorting to up-conversion, frequency translation and/or carrier modulation functions. This aspect may further enhance the LPI/LPD/LPE feature(s) of a communications system.

In embodiments of the invention where a bandwidth of a signal to be transmitted by a transmitter (such as the transmitter illustrated in FIG. 7) exceeds a bandwidth limit associated with an antenna and/or other element of the transmitter, the signal may be decomposed/segmented/divided into a plurality of components, each component of the plurality of components having a bandwidth that is smaller than the bandwidth of the signal. Accordingly, a transmitter may be configured with a corresponding plurality of antennas and/or a corresponding plurality of other elements to transmit the plurality of components. Analogous operations for reception may be included in a receiver.

Figure 9:
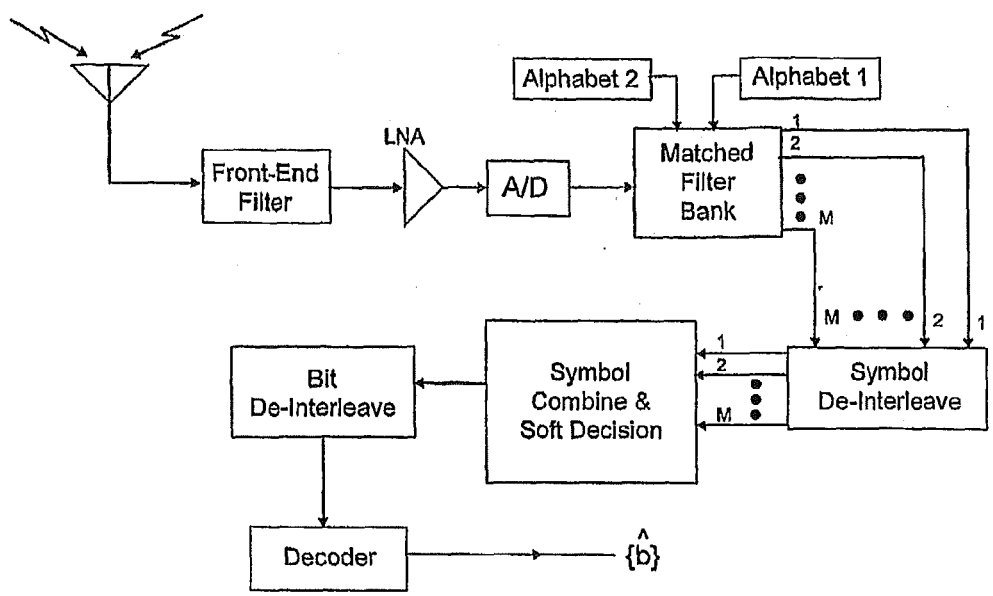
FIG. 9 is a schematic illustration of further functions of a receiver according to further embodiments of the present invention.

In some embodiments of the invention, a receiver (destination) that is configured to receive communications information from a transmitter (source) comprising the functionality of FIG. 7, may be provided with sufficient information to generate a matched filter bank corresponding to the transmitter waveform set of the M-ary alphabet $\{U_1(nT), U_2(nT), \ldots, U_M(nT)\}$. Such a receiver may be substantially synchronized with the transmitter using GPS-derived timing information (i.e., TOD). FIG. 9 illustrates elements of such a receiver, according to exemplary embodiments of the present invention. As illustrated in FIG. 9, following front-end filtering, amplification and Analog-to-Digital (A/D) and/or discrete-time conversion of a received waveform, a matched-filter bank, comprising matched filters reflecting the TOD-dependent waveform alphabets used by the transmitter, is used for detection of information. The receiver may have information regarding what waveform alphabet the transmitter may have used as a function of TOD. As such, the receiver, operating in substantial TOD synchronism with the transmitter, may know to configure the matched-filter bank with the appropriate (TOD-dependent) matched filter components to thereby achieve optimum or near optimum signal detection. Following matched-filter detection, symbol de-interleaving and symbol repeat combination, soft decisions of a received symbol sequence may be made, followed by bit de-interleaving and bit decoding, to thereby generate an estimate of a transmitted information bit sequence.

In accordance with some embodiments of the invention, a receiver architecture, such as, for example, the receiver architecture illustrated in FIG. 9, may further configure a matched filter bank to include a "rake" matched filter architecture, to thereby resolve multipath components and increase or maximize a desired received signal energy subject to multipath fading channels. Owing to the broadband nature of the communications alphabets, in accordance with some embodiments of the invention, a significant number of multipath components may be resolvable. Rake matched filter architectures are known to those skilled in the art and need not be described further herein (see, for example, John G. Proakis, "*Digital Communications*," McGraw-Hill, 1983, section 7.5 starting at 479; also see R. Price and P. E. Green Jr. "*A Communication Technique for Multipath Channels,*" Proc. IRE, Vol. 46, pp. 555-570, March 1958).

Figure 10:
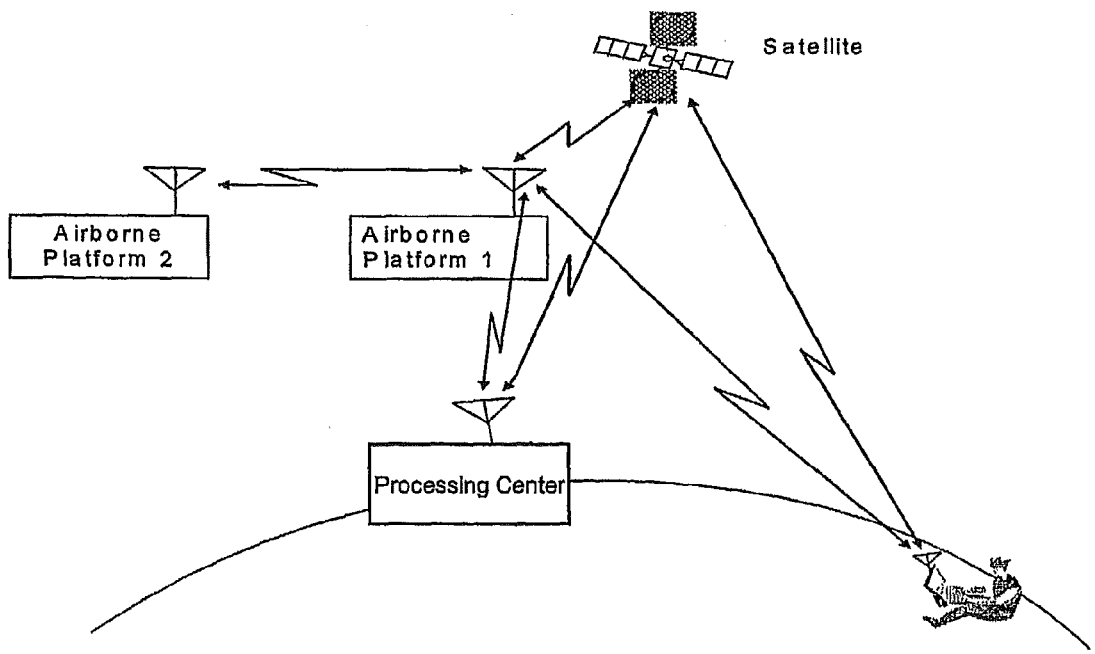
FIG. 10 is a schematic illustration of a communications system based upon one or more transmitters and one or more receivers according to further embodiments of the present invention.
Figure 11:
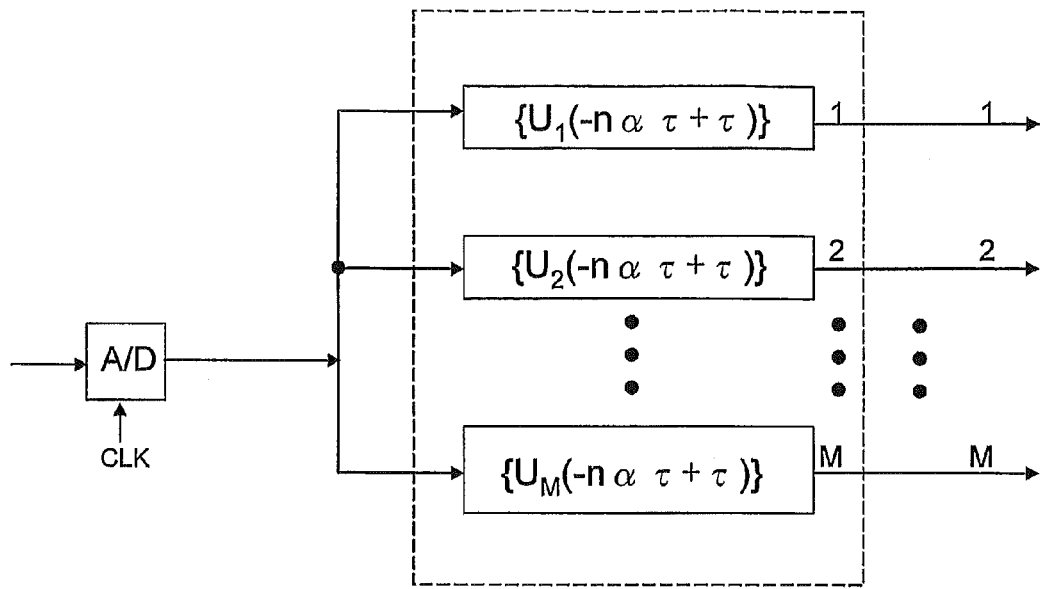
FIGS. 11 through 14 illustrate functions of a receiver according to further embodiments of the present invention.
Figure 12:
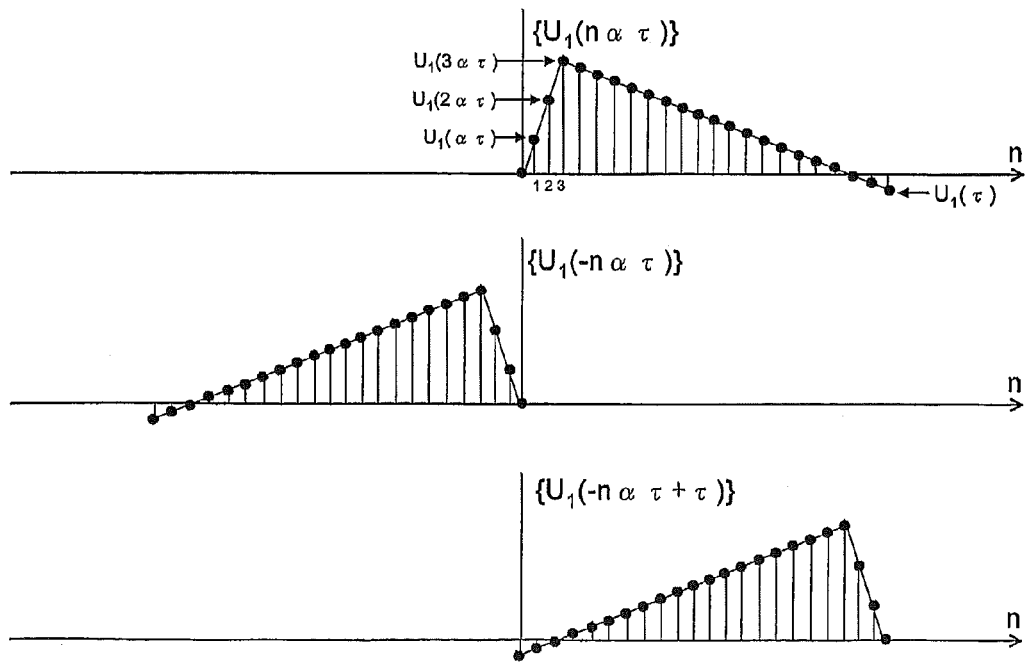
Figure 13:
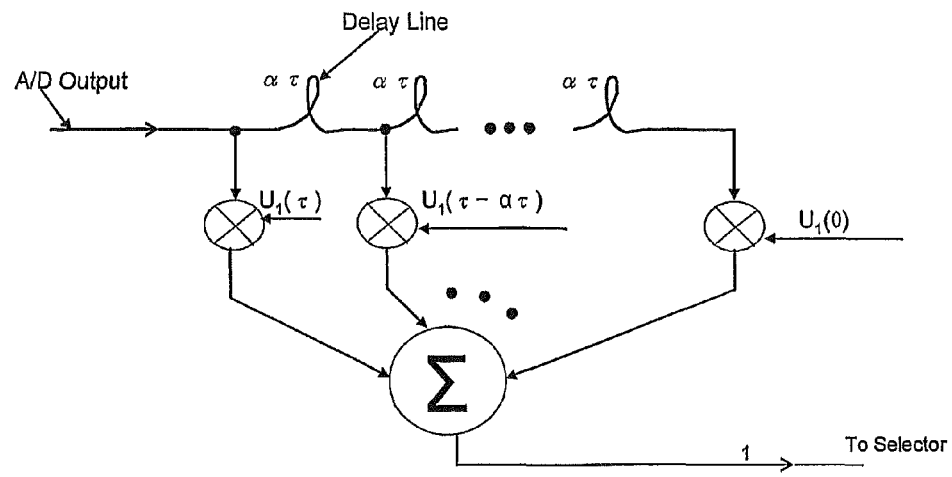
Figure 14:
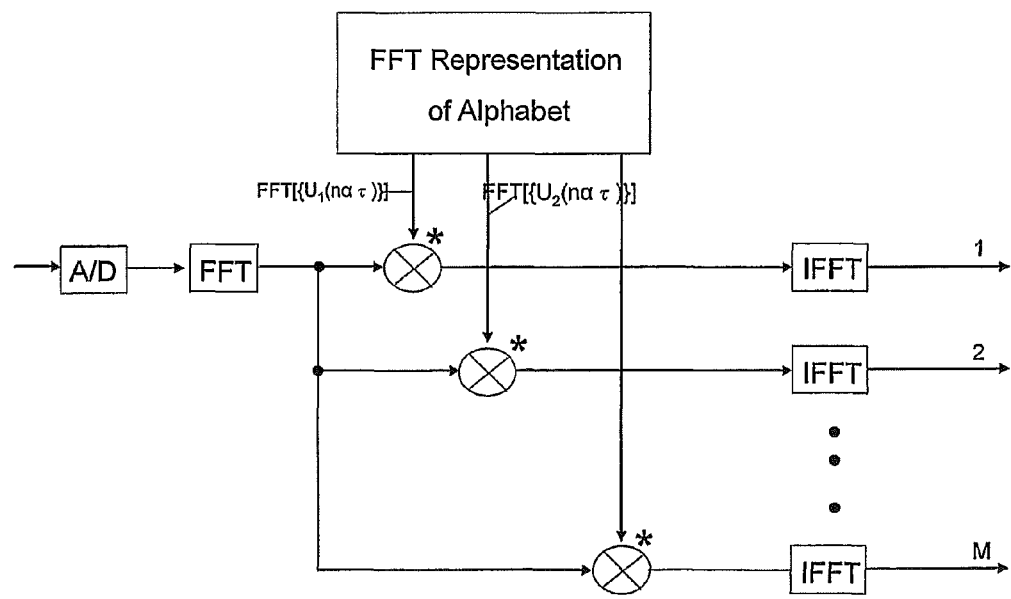

FIG. 10 illustrates an operational scenario relating to a communications system that may be a covert communications system, in accordance with some embodiments of the present invention, wherein air-to-ground, air-to-air, air-to-satellite and/or satellite-to-ground communications may be conducted. Ground-to-ground communications (not illustrated in FIG. 10) may also be conducted. Modes of communications may be, for example, point-to-point and/or point-to-multipoint. A network topology that is predetermined and/or configured in an ad hoc fashion, in accordance with principles known to those skilled in the art, may be used to establish communications in accordance with any of the embodiments of the invention and/or combinations (or sub-combinations) thereof.

Figure 15:
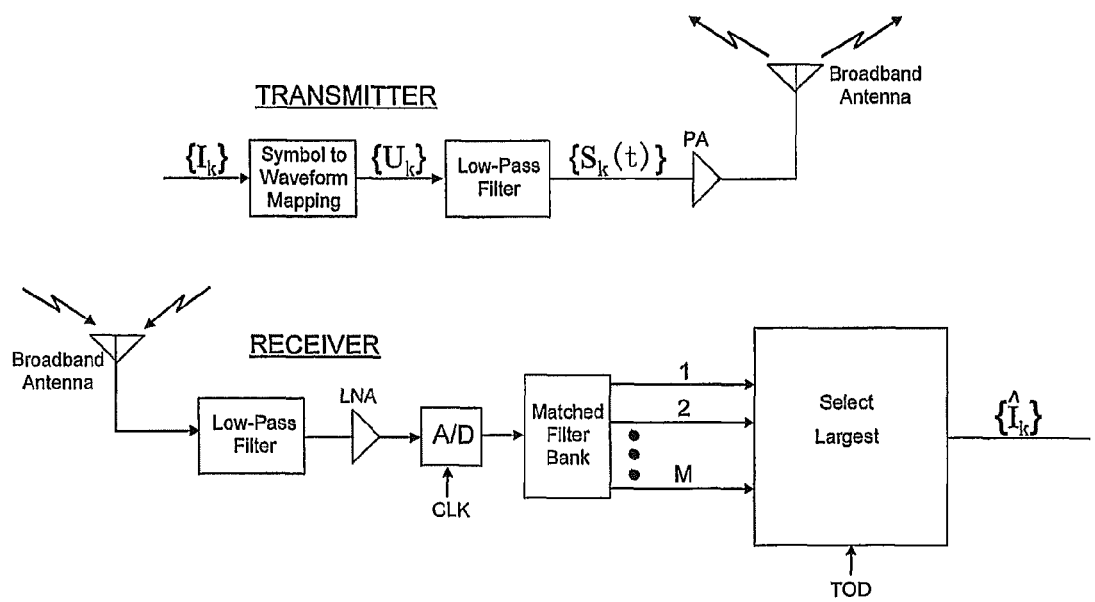
FIG. 15 is a schematic illustration of further functions of a transmitter and receiver according to further embodiments of the present invention.
Figure 16:
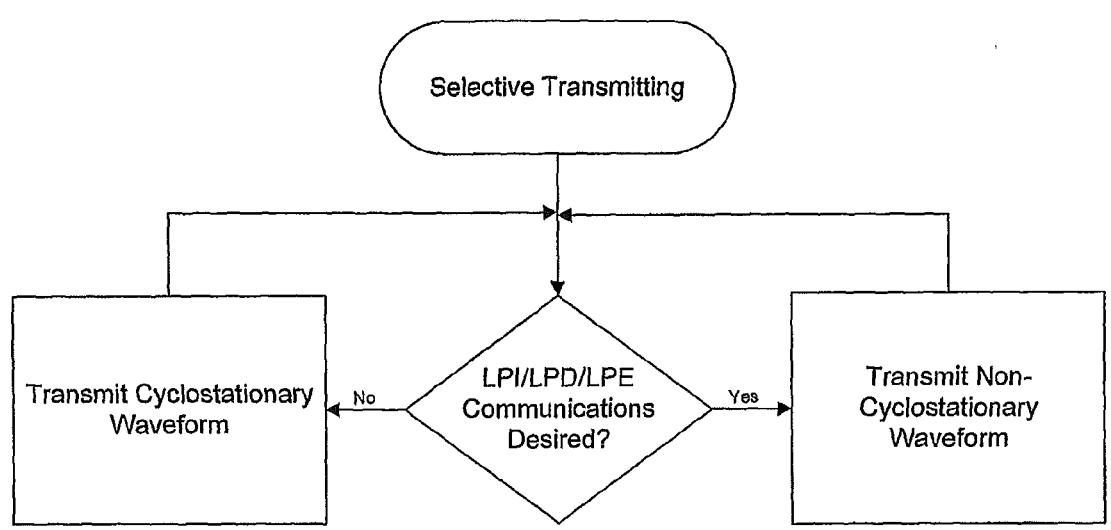
FIG. 16 is a flowchart of operations that may be performed according to some embodiments of the present invention.

FIGS. 11 through 14 illustrate elements relating to a matched filter and/or a matched filter bank in accordance with exemplary embodiments of the invention, as will be appreciated by those skilled in the art. FIG. 15 further illustrates elements of a transmitter/receiver combination in accordance with further embodiments of the invention. The design and operation of blocks that are illustrated in the block diagrams herein and not described in detail are well known to those having skill in the art.

Embodiments of the present invention have been described above in terms of systems, methods, devices and/or computer program products that provide communications devoid of cyclostationary features. However, other embodiments of the present invention may selectively provide these communications devoid of cyclostationary features. For example, as shown in FIG. 15, if LPI/LPD/LPE and/or minimum interference communications are desired, then non-cyclostationary waveforms may be transmitted. However, when LPI/LPD/LPE and/or minimum interference communications need not be transmitted, cyclostationary waveforms may be used. An indicator may be provided to allow a receiver/transmitter to determine whether cyclostationary or non-cyclostationary waveforms are being transmitted or need to be transmitted. Accordingly, a given system, method, device and/or computer program can operate in one of two modes, depending upon whether LPI/LPD/LPE and/or minimum interference communications are desired, and/or based on other parameters and/or properties of the communications environment.

In still further embodiments of the present invention, a transmitter may be configured to selectively radiate a pseudo-random noise waveform that may be substantially devoid of information and is distributed in accordance with at least one statistical distribution such as, for example, Normal/Gaussian, Bernoulli, Geometric, Pascal/Negative Binomial, Exponential, Erlang, Weibull, Chi-Squared, F, Student's t, Rise, Pareto, Poisson, Binomial, Uniform, Gamma, Beta, Laplace, Cauchy, Rayleigh, Maxwell and/or any other distribution. The at least one statistical distribution may be truncated and the pseudo-random noise waveform may occupy a bandwidth that is substantially the same as a bandwidth occupied by a communications waveform. The transmitter may be configured to selectively radiate the pseudo-random noise waveform during periods of time during which no communications information is being transmitted. This may be used, in some embodiments, to create a substantially constant/invariant ambient/background noise floor, that is substantially independent of whether or not communications information is being transmitted, to thereby further mask an onset of communications information transmission.

It will be understood by those skilled in the art that the communications systems, waveforms, methods, computer program products and/or principles described herein may also find applications in environments wherein covertness may not be a primary concern. Communications systems, waveforms, methods, computer program products and/or principles described herein may, for example, be used to provide short-range wireless communications (that may, in accordance with some embodiments, be broadband short-range wireless communications) in, for example, a home, office, conference and/or business environment while reducing and/or minimizing a level of interference to one or more other communications services and/or systems that may be using the same, substantially the same and/or near-by frequencies as the short-range communications system.

Other applications of the communications systems, waveforms, methods, computer program products and/or principles described herein will also occur to those skilled in the art, including, for example, radar applications and/or cellular telecommunications applications.

In a cellular telecommunications application, for example, a cellular telecommunications system, in accordance with communications waveform principles described herein, may be configured, for example, as an overlay to one or more conventional cellular/PCS systems and/or one or more other systems, using the frequencies of one or more licensed and/or unlicensed bands (that may also be used by the one or more conventional cellular/PCS systems and/or the one or more other systems) to communicate with user equipment using broadband and/or Ultra Wide-Band (UWB) waveforms. The broadband and/or UWB waveforms may be non-cyclostationary and Gaussian-distributed, for example, in accordance with the teachings of the present invention, to thereby reduce and/or minimize a level of interference to the one or more conventional cellular/PCS systems and/or to the one or more other systems by the overlay cellular telecommunications system and thereby allow the overlay cellular telecommunications system to reuse the available spectrum (which is also used by the one or more conventional cellular/PCS systems and/or the one or more other systems) to provide communications services to users.

According to some embodiments of the present invention, a cellular telecommunications system that is configured to communicate with user devices using communications waveforms in accordance with the transmitter, receiver and/or waveform principles described herein, is an overlay to one or more conventional cellular/PCS systems and/or to one or more other systems and is using the frequencies of one or more licensed and/or unlicensed bands (also being used by the one or more conventional cellular/PCS systems and/or the one or more other systems). The cellular telecommunications system may be further configured to provide communications preferentially using frequencies of the one or more licensed and/or unlicensed bands that are locally not used substantially and/or are locally used substantially as guardbands and/or transition bands by the one or more conventional cellular/PCS systems and/or the one or more other systems, to thereby further reduce a level of interference between the cellular telecommunications system and the one or more conventional cellular/PCS systems and/or the one or more other systems.

As used herein, the terms "locally not used substantially" and/or "locally used substantially as guardbands and/or transition bands" refer to a local service area of a base station and/or group of base stations and/or access point(s) of the cellular telecommunications system. In such a service area, the cellular telecommunications system may, for example, be configured to identify frequencies that are "locally not used substantially" and/or frequencies that are "locally used substantially as guardbands and/or transition bands" by the one or more conventional cellular/PCS systems and/or the one or more other systems and preferentially use the identified frequencies to communicate bidirectionally and/or unidirectionally with user equipment thereby further reducing or minimizing a measure of interference. While the present invention has been described in detail by way of illustration and example of preferred embodiments, numerous modifications, substitutions and/or alterations are possible without departing from the scope of the invention as described herein. Numerous combinations, sub-combinations, modifications, alterations and/or substitutions of embodiments described herein will become apparent to those skilled in the art. Such combinations, sub-combinations, modifications, alterations and/or substitutions of the embodiments described herein may be used to form one or more additional embodiments without departing from the scope of the present invention.

Embodiments of the present invention have been described above in terms of systems, methods, devices and/or computer program products that provide communication devoid of cyclostationary features. However, other embodiments of the present invention may selectively provide communications devoid of cyclostationary features. For example, as shown in FIG. 15, if LPI/LPD/LPE communications are desired, then non-cyclostationary waveforms may be transmitted. In contrast, when LPI/LPD/LPE communications need not be transmitted, cyclostationary waveforms may be used. An indicator may be provided to allow a receiver to determine whether cyclostationary or non-cyclostationary waveforms are being transmitted. Accordingly, a given system, method, device and/or computer program can operate in one of two modes, depending upon whether LPI/LPD/LPE communications are desired.

The present invention has been described with reference to block diagrams and/or flowchart illustrations of methods, apparatus (systems) and/or computer program products according to embodiments of the invention. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

It should also be noted that in some alternate implementations, the functions/acts noted in the blocks of the block diagrams/flowcharts may occur out of the order noted in the block diagram/flowcharts. For example, two blocks shown in succession may in fact be executed substantially concurrently or the blocks may sometimes be executed in the reverse order, depending upon the functionality/acts involved. Moreover, the functionality of a given block of the flowcharts/block diagrams may be separated into multiple blocks and/or the functionality of two or more blocks of the flowcharts/block diagrams may be at least partially integrated.

In the specification, there have been disclosed embodiments of the invention and, although specific terms are employed, they are used in a generic and descriptive sense only and not for purposes of limitation; the scope of the invention being set forth in the following claims.

What is claimed is:

1. A communications method comprising:
   forming a desired spectrum shape for a waveform;
   generating the waveform responsive to the desired spectrum shape; and
   transmitting and/or receiving information by transmitting and/or receiving at a transmitter and/or at a receiver, a plurality of elements of the waveform sequentially one after another via a single carrier frequency;
   wherein generating the waveform responsive to the desired spectrum shape comprises generating a discrete time-domain waveform $U(nT)$; wherein n denotes a discrete time index of $U(nT)$; wherein n=1, 2, ..., N; and $NT \leq \tau$; wherein $\tau$ denotes a time span of the discrete time-domain waveform $U(nT)$;
   wherein transmitting and/or receiving information by transmitting and/or receiving at a transmitter and/or at a receiver, a plurality of elements of the waveform sequentially one after another via a single carrier frequency comprises transmitting and/or receiving the elements of $U(nT)$ sequentially via the single carrier frequency by transmitting and/or receiving $U(T)$ via the single carrier frequency, followed by transmitting and/or receiving $U(2T)$ via the single carrier frequency, ..., followed by transmitting and/or receiving $U(NT)$ via the single carrier frequency; and
   wherein said forming a desired spectrum shape for a waveform further comprises:
   using a first plurality of frequencies over a first time interval; and
   using a second plurality of frequencies over a second time interval;
   wherein the first plurality of frequencies differs from the second plurality of frequencies in at least one frequency.

2. The communications method according to claim 1, wherein said forming a desired spectrum shape for a waveform is performed at the transmitter.

3. The communications method according to claim 1, wherein said forming a desired spectrum shape for a waveform is performed at a distance from the transmitter and is then relayed to the transmitter.

4. The communications method according to claim 1, wherein said forming a desired spectrum shape for a waveform further comprises:
   forming the desired spectrum shape to include a first frequency interval comprising a first spectral level that is non-zero and to also include a second frequency interval comprising a second spectral level that is substantially zero.

5. The communications method according to claim 4, wherein said forming a desired spectrum shape for a waveform further comprises:
   forming the desired spectrum shape to also include a third frequency interval comprising a third spectral level that is non-zero;
   wherein the second frequency interval that comprises the second spectral level that is substantially zero is situated between the first and third frequency intervals.

6. A communications method comprising:
   forming a desired spectrum shape for a waveform to include at least one frequency that provides a frequency content to the waveform and at least one frequency that is excluded from providing a frequency content to the waveform;
   generating the waveform responsive to the desired spectrum shape; and
   transmitting and/or receiving information by transmitting and/or receiving at a transmitter and/or at a receiver, a plurality of elements of the waveform sequentially one after another via a single carrier frequency;
   wherein generating the waveform responsive to the desired spectrum shape comprises generating a discrete time-domain waveform U(nT); wherein n denotes a discrete time index of U(nT); wherein n=1, 2, ..., N; and NT≦τ; wherein τ denotes a time span of the discrete time-domain waveform U(nT);
   wherein transmitting and/or receiving information by transmitting and/or receiving at a transmitter and/or at a receiver, a plurality of elements of the waveform sequentially one after another via a single carrier frequency comprises transmitting and/or receiving the elements of U(nT) sequentially via the single carrier frequency by transmitting and/or receiving U(T) via the single carrier frequency, followed by transmitting and/or receiving U(2T) via the single carrier frequency, ..., followed by transmitting and/or receiving U(NT) via the single carrier frequency; and
   wherein said forming a desired spectrum shape for a waveform further comprises:
   using a first plurality of frequencies over a first time interval; and
   using a second plurality of frequencies over a second time interval;
   wherein the first plurality of frequencies differs from the second plurality of frequencies in at least one frequency.

7. The communications method according to claim 6, wherein said forming a desired spectrum shape for a waveform is performed at the transmitter.

8. The communications method according to claim 6, wherein said forming a desired spectrum shape for a waveform is performed at a distance from the transmitter and is then relayed to the transmitter.

9. The communications method according to claim 6, wherein said forming a desired spectrum shape for a waveform further comprises:
   forming the desired spectrum shape to include a first frequency interval comprising a first spectral level that is non-zero and to also include a second frequency interval comprising a second spectral level that is substantially zero.

10. The communications method according to claim 9, wherein said forming a desired spectrum shape for a waveform further comprises:
    forming the desired spectrum shape to also include a third frequency interval comprising a third spectral level that is non-zero;
    wherein the second frequency interval that comprises the second spectral level that is substantially zero is situated between the first and third frequency intervals.

11. A communications system comprising:
    a processor that is configured to form a desired spectrum shape for a waveform and to generate the waveform responsive to the desired spectrum shape; and
    a transmitter and/or receiver that is/are configured to transmit and/or receive information by transmitting and/or receiving a plurality of elements of the waveform sequentially one after another via a single carrier frequency;
    wherein the waveform comprises a discrete time-domain waveform U(nT); wherein n denotes a discrete time index of U(nT); wherein n=1, 2, ..., N; and NT≦τ; wherein τ denotes a time span of the discrete time-domain waveform U(nT);
    wherein the transmitter and/or receiver is/are further configured to transmit and/or receive the elements of U(nT) sequentially via the single carrier frequency by transmitting and/or receiving U(T) via the single carrier frequency, followed by transmitting and/or receiving U(2T) via the single carrier frequency, ..., followed by transmitting and/or receiving U(NT) via the single carrier frequency; and
    wherein the processor is configured to form the desired spectrum shape to include:
    a first plurality of frequencies over a first time interval; and
    a second plurality of frequencies over a second time interval;
    wherein the first plurality of frequencies differs from the second plurality of frequencies in at least one frequency.

12. The communications system according to claim 11, wherein the processor is configured to form the desired spectrum shape to include:
    a first frequency interval comprising a first spectral level that is non-zero and a second frequency interval comprising a second spectral level that is substantially zero.

13. The communications system according to claim 12, wherein the processor is configured to form the desired spectrum shape to further include:
    a third frequency interval comprising a third spectral level that is non-zero;
    wherein the second frequency interval that comprises the second spectral level that is substantially zero is situated between the first and third frequency intervals.

14. A communications system comprising:
    a processor that is configured to form a desired spectrum shape for a waveform and to generate the waveform responsive to the desired spectrum shape; and
    a transmitter and/or receiver that is/are configured to transmit and/or receive information by transmitting and/or receiving a plurality of elements of the waveform sequentially one after another via a single carrier frequency;
    wherein the processor is configured to generate the waveform responsive to the desired spectrum shape by generating a discrete time-domain waveform U(nT);

wherein n denotes a discrete time index of U(nT); wherein n=1, 2, . . . , N; and NT≦τ; wherein τ denotes a time span of the discrete time-domain waveform U(nT);

wherein the transmitter and/or receiver is/are configured to transmit and/or receive information by transmitting and/or receiving a plurality of elements of the waveform sequentially one after another via a single carrier frequency by transmitting and/or receiving the elements of U(nT) sequentially via the single carrier frequency by transmitting and/or receiving U(T) via the single carrier frequency, followed by transmitting and/or receiving U(2T) via the single carrier frequency, . . . , followed by transmitting and/or receiving U(NT) via the single carrier frequency;

wherein the processor is configured to form the desired spectrum shape for the waveform to include:

at least one frequency that provides a frequency content to the waveform; and at least one frequency that is excluded from providing a frequency content to the waveform; and wherein the processor is further configured to form the desired spectrum shape to include:

a first plurality of frequencies over a first time interval; and a second plurality of frequencies over a second time interval;

wherein the first plurality of frequencies differs from the second plurality of frequencies in at least one frequency.

15. The communications system according to claim 14, wherein the processor is further configured to form the desired spectrum shape to include:

a first frequency interval comprising a first spectral level that is non-zero and to also include a second frequency interval comprising a second spectral level that is substantially zero.

16. The communications system according to claim 15, wherein the processor is further configured to form the desired spectrum shape to further include:

a third frequency interval comprising a third spectral level that is non-zero;

wherein the second frequency interval that comprises the second spectral level that is substantially zero is situated between the first and third frequency intervals.

17. A communications method comprising:

selecting a frequency interval over which a waveform U(nT) is to exist; wherein n denotes a discrete time index and wherein n=1, 2, . . . , N;

allowing at least one frequency that is included in the selected frequency interval to provide a frequency content to the waveform U(nT);

excluding at least one frequency that is included in the selected frequency interval from providing a frequency content to the waveform U(nT);

forming the waveform U(nT) comprising a plurality of elements U(T), U(2T), . . . , U(NT), corresponding to respective integer values 1, 2, . . . , N of the discrete time index n; and transmitting and/or receiving information by transmitting and/or receiving at a transmitter and/or at a receiver, the plurality of elements U(T), U(2T), . . . , U(NT) of the waveform U(nT) sequentially one after another via a single carrier frequency by first transmitting and/or receiving U(T) via the single carrier frequency, followed by transmitting and/or receiving U(2T) via the single carrier frequency, . . . , followed by transmitting and/or receiving U(NT) via the single carrier frequency;

wherein said forming the waveform U(nT) further comprises:

generating a first waveform using a first plurality of frequencies over a first time interval; and generating a second waveform using a second plurality of frequencies over a second time interval;

wherein the second plurality of frequencies differs from the first plurality of frequencies in at least one frequency.

18. The communications method according to claim 17, wherein said forming the waveform U(nT) comprises:

generating a waveform comprising a first spectral shape that is non-zero over a first plurality of frequencies that is included in said selected frequency interval and a second spectral shape that is substantially zero over a second plurality of frequencies that is also included in said selected frequency interval.

19. The communications method according to claim 17, wherein said selecting a frequency interval over which a waveform U(nT) is to exist comprises:

identifying frequencies to be used to communicate; and reducing a measure of interference by preferentially using the identified frequencies while refraining from using other frequencies.

20. The communications method according to claim 17, wherein said selecting a frequency interval over which a waveform U(nT) is to exist comprises:

selecting a frequency interval that is between 1525 MHz and 1660.5 MHz and excluding a GPS frequency interval that is included therein.

21. The communications method according to claim 17, wherein said forming the waveform U(nT) comprises:

using a Fourier transform and an inverse Fourier transform.

22. A communications system comprising:

a processor that is configured to select a frequency interval over which a waveform U(nT) is to exist, wherein n denotes a discrete time index and wherein n=1, 2, . . . , N; to allow at least one frequency that is included in the selected frequency interval to provide a frequency content to the waveform U(nT); to exclude at least one frequency that is included in the selected frequency interval from providing a frequency content to the waveform U(nT) and to form the waveform U(nT) comprising a plurality of elements U(T), U(2T), . . . , U(NT), corresponding to respective integer values 1, 2, . . . , N of the discrete time index n; and a transmitter and/or receiver that is/are configured to transmit and/or receive information by transmitting and/or receiving the plurality of elements U(T), U(2T), . . . , U(NT) of the waveform U(nT) sequentially one after another via a single carrier frequency by first transmitting and/or receiving U(T) via the single carrier frequency, followed by transmitting and/or receiving U(2T) via the single carrier frequency, . . . , followed by transmitting and/or receiving U(NT) via the single carrier frequency;

wherein the processor is further configured to:

generate a first waveform using a first plurality of frequencies over a first time interval; and generate a second waveform using a second plurality of frequencies over a second time interval;

wherein the second plurality of frequencies differs from the first plurality of frequencies in at least one frequency.

23. The communications system according to claim 22, wherein the processor is further configured to:

generate a waveform comprising a first spectral shape that is non-zero over a first plurality of frequencies that is included in said selected frequency interval and a second spectral shape that is substantially zero over a second plurality of frequencies that is also included in said selected frequency interval.

24. The communications system according to claim 22, wherein the processor is further configured to:
   identify frequencies to be used to communicate such as to reduce a measure of interference and to preferentially use the identified frequencies and refrain from using other frequencies.

25. The communications system according to claim 22, wherein the processor is further configured to:
   select a frequency interval that is between 1525 MHz and 1660.5 MHz and exclude a GPS frequency interval that is included therein.

26. The communications system according to claim 22, wherein the transmitter comprises a wireless transmitter.

27. The communications system according to claim 22, wherein the processor is further configured to form the waveform U(nT) comprising the plurality of elements U(T), U(2T), . . . , U(NT) by using a Fourier transform and an inverse Fourier transform.

28. The communications system according to claim 27, wherein the Fourier transform provides a spectrum shape that is altered in at least one frequency thereof responsive to an interference concern; and wherein the inverse Fourier transform provides a time-domain waveform responsive to the altered spectrum shape that is used by the processor to form the waveform.

* * * * *